US010943504B2

(12) United States Patent
Keller et al.

(10) Patent No.: US 10,943,504 B2
(45) Date of Patent: Mar. 9, 2021

(54) INTERACTIVE INTRAVASCULAR PROCEDURE TRAINING AND ASSOCIATED DEVICES, SYSTEMS, AND METHODS

(71) Applicant: KONINKLIJKE PHILIPS N.V., Eindhoven (NL)

(72) Inventors: Jacqueline Keller, San Diego, CA (US); David Anderson, Temecula, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 300 days.

(21) Appl. No.: 15/738,268

(22) PCT Filed: Jun. 15, 2016

(86) PCT No.: PCT/IB2016/053517
§ 371 (c)(1),
(2) Date: Dec. 20, 2017

(87) PCT Pub. No.: WO2016/207762
PCT Pub. Date: Dec. 29, 2016

(65) Prior Publication Data
US 2018/0182262 A1 Jun. 28, 2018

Related U.S. Application Data

(60) Provisional application No. 62/184,763, filed on Jun. 25, 2015.

(51) Int. Cl.
*G09B 23/28* (2006.01)
*G09B 7/04* (2006.01)
(Continued)

(52) U.S. Cl.
CPC ............... *G09B 23/28* (2013.01); *G09B 7/04* (2013.01); *G09B 7/08* (2013.01); *G09B 9/00* (2013.01);
(Continued)

(58) Field of Classification Search
CPC .... G09B 23/28; G09B 23/285; G09B 23/286; G09B 7/00; G09B 7/04; G09B 7/08; G09B 9/00; G09B 23/281; G09B 23/283
See application file for complete search history.

(56) References Cited

U.S. PATENT DOCUMENTS 6,200,268 B1    3/2001  Vince
6,381,350 B1    4/2002  Klingensmith
(Continued)

FOREIGN PATENT DOCUMENTS

WO    2007059172 A2    5/2007
WO    2010025336 A1    3/2010
(Continued)

OTHER PUBLICATIONS

Bismuth, Jean et al "Incorporating Simulation in Vascular Surgery Education", Journal of Vascular Surgery, vol. 52, No. 4, May 2010.

*Primary Examiner* — Timothy A Musselman

(57) ABSTRACT

Devices, systems, and methods of intravascular procedure training are provided. In some instances, the method includes outputting, from a computing device to a display device in communication with the computing device, a first visual representation of a blood vessel; determining, using the computing device, a first course of action based on the first visual representation of the blood vessel; receiving, at an input device in communication with the computing device, a user input associated with a second course of action; comparing, using the computing device, the first and second courses of action; and outputting, from the computing device to the display, a comparison of the first and (Continued)

second courses of action. Associated devices and systems are also provided.

14 Claims, 13 Drawing Sheets

(51) Int. Cl.
*G09B 7/08* (2006.01)
*G09B 9/00* (2006.01)
(52) U.S. Cl.
CPC ......... *G09B 23/285* (2013.01); *G09B 23/286* (2013.01)

(56) References Cited

U.S. PATENT DOCUMENTS

| | | |
|---|---|---|
| 7,074,188 B2 | 7/2006 | Nair |
| 7,175,597 B2 | 2/2007 | Vince |
| 7,215,802 B2 | 5/2007 | Klingensmith |
| 7,359,554 B2 | 4/2008 | Klingensmith |
| 7,627,156 B2 | 12/2009 | Margolis |
| 7,930,014 B2 | 4/2011 | Huennekens |
| 7,988,633 B2 | 8/2011 | Hossack |
| 8,629,888 B1 | 1/2014 | Chen |
| 9,042,613 B2* | 5/2015 | Spilker .................. G06K 9/46 382/128 |
| 9,364,153 B2 | 6/2016 | Merritt |
| 2002/0127525 A1 | 9/2002 | Arington |
| 2003/0187362 A1 | 10/2003 | Murphy |
| 2004/0009459 A1* | 1/2004 | Anderson ........... G06F 19/3481 434/262 |
| 2005/0187461 A1* | 8/2005 | Murphy ................. G09B 23/30 600/416 |
| 2008/0221442 A1 | 9/2008 | Tolkowsky |
| 2014/0187920 A1 | 7/2014 | Millett |
| 2014/0270429 A1 | 9/2014 | Nair |
| 2015/0025330 A1 | 1/2015 | Davies |
| 2015/0119705 A1 | 4/2015 | Tochterman |
| 2016/0073972 A1 | 3/2016 | Alpert |
| 2016/0135757 A1 | 5/2016 | Anderson |
| 2016/0135787 A1 | 5/2016 | Anderson |
| 2016/0157785 A1 | 6/2016 | Merritt |
| 2016/0157787 A1 | 6/2016 | Merrit |
| 2016/0157798 A1 | 6/2016 | Anderson |
| 2016/0157802 A1 | 6/2016 | Anderson |
| 2016/0157803 A1 | 6/2016 | Keller |
| 2016/0157807 A1 | 6/2016 | Anderson |
| 2016/0157808 A1 | 6/2016 | Merritt |
| 2016/0166232 A1 | 6/2016 | Merritt |
| 2016/0166327 A1 | 6/2016 | Keller |

FOREIGN PATENT DOCUMENTS

| | | |
|---|---|---|
| WO | 2010058398 A2 | 5/2010 |
| WO | 2012014212 A2 | 2/2012 |

\* cited by examiner

INTERACTIVE INTRAVASCULAR PROCEDURE TRAINING AND ASSOCIATED DEVICES, SYSTEMS, AND METHODS

CROSS-REFERENCE TO PRIOR APPLICATIONS

This application is the U.S. National Phase application under 35 U.S.C. § 371 of International Application No. PCT/IB2016/053517, filed on Jun. 15, 2016, which claims the benefit of U.S. Provisional Patent Application No. 62/184,763, filed on Jun. 25, 2015. These applications are hereby incorporated by reference herein.

TECHNICAL FIELD

The present disclosure relates generally to the assessment of patient's blood vessels and heart to determine an appropriate therapeutic intervention. For example, some embodiments of the present disclosure are suited for teaching a user how to obtain diagnostic data and/or plan a therapeutic intervention in a simulated intravascular procedure.

BACKGROUND

Innovations in diagnosing and verifying the level of success of treatment of disease have progressed from solely external imaging processes to include internal diagnostic processes. In addition to traditional external image techniques such as X-ray, MRI, CT scans, single-photon emission computed tomography (SPECT), fluoroscopy, and angiography, small sensors may now be placed directly in the body. For example, diagnostic equipment and processes have been developed for diagnosing vasculature blockages and other vasculature disease by means of ultra-miniature sensors placed upon the distal end of a flexible elongate member such as a catheter, or a guide wire used for catheterization procedures. For example, known medical sensing techniques include intravascular ultrasound (IVUS), forward looking IVUS (FL-IVUS), fractional flow reserve (FFR) determination, Instant Wave-Free Ratio™ (iFR®) determination, a coronary flow reserve (CFR) determination, optical coherence tomography (OCT), trans-esophageal echocardiography, and image-guided therapy.

When an occluded blood vessel that requires treatment is identified, a medical professional considers various therapeutic procedures, including percutaneous coronary intervention (PCI) such as angioplasty and/or stenting, as well as coronary artery bypass grafting (CABG). Clinicians conventionally rely on some combination of external imaging, intravascular imaging, and/or intravascular physiologic measurements to plan a therapeutic intervention. Planning the therapeutic intervention can include selecting various parameters related to the stent, such as positioning, length, diameter, etc. While the collected data can help in planning the therapeutic intervention, an individual clinician's experience and practice remain an important part of the process.

Successful intravascular procedures thus involve proper training and practice for a novice user. Novice users, such as new doctors or medical students, currently learn interventional procedures by shadowing experienced users and participating in proctored cases on actual patients. While these experiences are helpful, they may be limited in number. Further, shadowing and proctored cases require participation of others, such as senior clinicians. These circumstances limit how much and how often novice users gain experience. Some users have access to simulators that can be purchased or rented by a medical services provider to simulate vessels. These simulators allow for trainees to physically handle an intravascular device, such as a catheter, while collecting physiologic and/or imaging data within the simulated vessel. However, these systems have limited mobility because they are attached to physical devices. Further, such systems do not allow novice users to apply the collected data, such as by formulating a plan for therapy, or teach the user to correctly identify where the lesion is and where measurements should be made.

Accordingly, there remains a need for improved devices, systems, and methods for training users with simulated intravascular procedures.

SUMMARY

Embodiments of the present disclosure are configured to provide a virtual, interactive teaching environment for diagnostic and therapeutic intravascular procedures. Using, e.g., pressure, flow, and/or imaging data from a previous intravascular procedure, users are walked through the process of collecting different types of intravascular data and/or making decisions about therapeutic interventions based on the collected data. Novice users can determine which type of data to collect, in which order the data is collected, where in the blood vessel the data is collected, etc. The computing system provides feedback on the user's choices and guides them to make choices that will assist in selecting the proper therapeutic intervention. Once the therapeutic intervention is selected, the user can choose various parameters of the procedure. Similarly, the computing system provides feedback on the user's choices about the type and parameters of the therapy to teach them to perform efficacious interventions.

In one embodiment, a method of intravascular procedure training is provided. The method includes outputting, from a computing device to a display device in communication with the computing device, a first visual representation of a blood vessel; determining, using the computing device, a first course of action based on the first visual representation of the blood vessel; receiving, at an input device in communication with the computing device, a user input associated with a second course of action; comparing, using the computing device, the first and second courses of action; and outputting, from the computing device to the display, a comparison of the first and second courses of action.

In some embodiments, the course of action is a diagnostic procedure. In some embodiments, the diagnostic procedure includes obtaining at least one of angiogram data, fluoroscopy data, pressure data, flow data, imaging data, disease quantification data, virtual histology data, or co-registration data. In some embodiments, the course of action is a therapeutic procedure. In some embodiments, the therapeutic procedure includes at least one of angioplasty, stenting, or coronary artery bypass grafting (CABG).

In one embodiment, an intravascular procedure training system is provided. The system includes a display device configured to display visual representations associated a blood vessel; an input device configured to receive user inputs associated with the blood vessel; and a computing device in communication with the display device and the input device, the computing device configured to: output, to a display, a first visual representation of a blood vessel; determine a first course of action based on the first visual representation of the blood vessel; receive, from the input device, a signal based a user input associated with a second course of action; compare the first and second courses of action; and output, to the display device, a comparison of the first and second courses of action.

In some embodiments, the course of action is a diagnostic procedure. In some embodiments, the diagnostic procedure is associated with obtaining at least one of angiogram data, fluoroscopy data, pressure data, flow data, imaging data, disease quantification data, virtual histology data, or co-registration data. In some embodiments, the course of action is a therapeutic procedure. In some embodiments, the therapeutic procedure includes at least one of angioplasty, stenting, or coronary artery bypass grafting (CABG).

In one embodiment, a method of simulating an intravascular procedure is provided. The method includes outputting, from a computing device to a display device in communication with the computing device, a visual representation of first data representative of a blood vessel; determining, using the computing device, second data representative of the blood vessel, the first and second data capable of being used to determine a first therapeutic intervention for the blood vessel; receiving, at an input device in communication with the computing device, a user input selecting third data representative of the blood vessel; comparing, using the computing device, the second data and third data; and outputting, from the computing device to the display, a visual representation of the comparison of the second data and third data.

In some embodiments, the comparing includes determining if the third data is the same as the second data. In some embodiments, the outputting includes at least one of: providing a visual representation indicating that the third data is the same as the second data; or providing a visual representation indicating that the third data is the different than the second data. In some embodiments, the method further includes outputting, from the computing device to the display device, a plurality of options associated with data types representative of the blood vessel, and wherein the receiving a user input selecting third data includes receiving selection of at least one of the plurality of data options. In some embodiments, the method further includes receiving, at the input device in communication with the computing device, a user input selecting the first data representative of the blood vessel. In some embodiments, at least one of the first data, second data, or third data is selected from the group consisting of: angiogram data, fluoroscopy data, pressure data, flow data, imaging data, disease quantification data, virtual histology data, and co-registration data. In some embodiments, the method further includes determining, using the computing device, the first therapeutic intervention for the blood vessel based on at least one of the first data, second data, or third data. In some embodiments, the method further includes receiving, at the input device in communication with the computing device, a user input selecting a second therapeutic intervention for the blood vessel. In some embodiments, the method further includes comparing, using the computing device, the first and second therapeutic interventions; and outputting, from the computing device to the display, a visual representation of the comparison of first and second therapeutic interventions. In some embodiments, the comparing includes determining if the first and second therapeutic interventions are the same, and wherein the outputting includes at least one of: providing a visual representation indicating that the first and second therapeutic interventions are the same; or providing a visual representation indicating that first and second therapeutic interventions are different. In some embodiments, the method further includes outputting, from the computing device to the display device, a plurality of data options representative of therapeutic intervention types for the blood vessel, and wherein the receiving a user input selecting a second therapeutic intervention includes receiving selection of at least one of the plurality of data options. In some embodiments, at least one of the first or section intervention is selected from the group consisting of: angioplasty, stenting, and coronary artery bypass grafting (CABG).

In one embodiment, a system for simulating an intravascular procedure is provided. The system includes a display device configured to display visual representations associated a blood vessel; an input device configured to receive user inputs associated with the blood vessel; and a computing device in communication with the display device and the input device, the computing device configured to: output, to the display device, a visual representation of first data representative of the blood vessel; determine second data representative of the blood vessel, the first and second data capable of being used to determine a first therapeutic intervention for the blood vessel; receive, from the input device, a signal based on a user input selecting third data representative of the blood vessel; compare the second data and third data; and output, to the display, a visual representation of the comparison of the second data and third data.

In some embodiments, the computing device is configured to compare the second and third by determining if the third data is the same as the second data. In some embodiments, the computing device is configured to output a visual representation of the comparison by at least one of: providing a visual representation indicating that the third data is the same as the second data; or providing a visual representation indicating that the third data is the different than the second data. In some embodiments, the computing device is further configured to output, to the display device, a plurality of options associated with data types representative of the blood vessel, and wherein the computing device is configured to receive a user input selecting third data by receiving selection of at least one of the plurality of data options. In some embodiments, the computing device is further configured to receive, from the input device, a signal based on a user input selecting the first data representative of the blood vessel. In some embodiments, at least one of the first data, second data, or third data is selected from the group consisting of: angiogram data, fluoroscopy data, pressure data, flow data, imaging data, disease quantification data, virtual histology data, and co-registration data. In some embodiments, the computing device is further configured to determine the first therapeutic intervention for the blood vessel based on at least one of the first data, second data, or third data. In some embodiments, the computing device is further configured to receive, from the input device, a signal based on a user input selecting a second therapeutic intervention for the blood vessel. In some embodiments, the computing device is further configured to compare the first and second therapeutic interventions; and output, to the display device, a visual representation of the comparison of first and second therapeutic interventions. In some embodiments, the computing device is configured to compare the first and second therapeutic interventions by determining if the first and second therapeutic interventions are the same, and wherein the computing device is configured to output a visual representation of the comparison by at least one of: providing a visual representation indicating that the first and second therapeutic interventions are the same; or providing a visual representation indicating that first and second therapeutic interventions. In some embodiments, the computing device is further configured to output, to the display device, a plurality of data options representative of therapeutic intervention types for the blood vessel, and wherein the computing device is configured to receive a signal based on a user input selecting a second therapeutic intervention by receiving selection of at least one of the plurality of data options. In some embodiments, at least one of the first or section intervention is selected from the group consisting of: angioplasty, stenting, and coronary artery bypass grafting (CABG).

In one embodiment, method of evaluating an intravascular procedure is provided. The method includes outputting, from a computing device to a display device in communication with the computing device, a visual representation of data representative of a blood vessel; and a therapeutic intervention for a blood vessel based on data; receiving, at an input device in communication with the computing device, a user input evaluating the therapeutic intervention; determining, using the computing device, whether the evaluation is appropriate; and outputting, from the computing device to the display device, a visual representation of the determination of whether the evaluation is appropriate.

In one embodiment, a system for evaluating an intravascular procedure is provided. The system includes a display device configured to display visual representations associated a blood vessel; an input device configured to receive user inputs associated with the blood vessel; and a computing device in communication with the display device and the input device, the computing device configured to: output, to the display device, a visual representation of: data representative of a blood vessel; and a therapeutic intervention for a blood vessel based on data; receive, from the input device, a signal based on a user input evaluating the therapeutic intervention; determine whether the evaluation is appropriate; and output, to the display device, a visual representation of the determination of whether the evaluation is appropriate.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
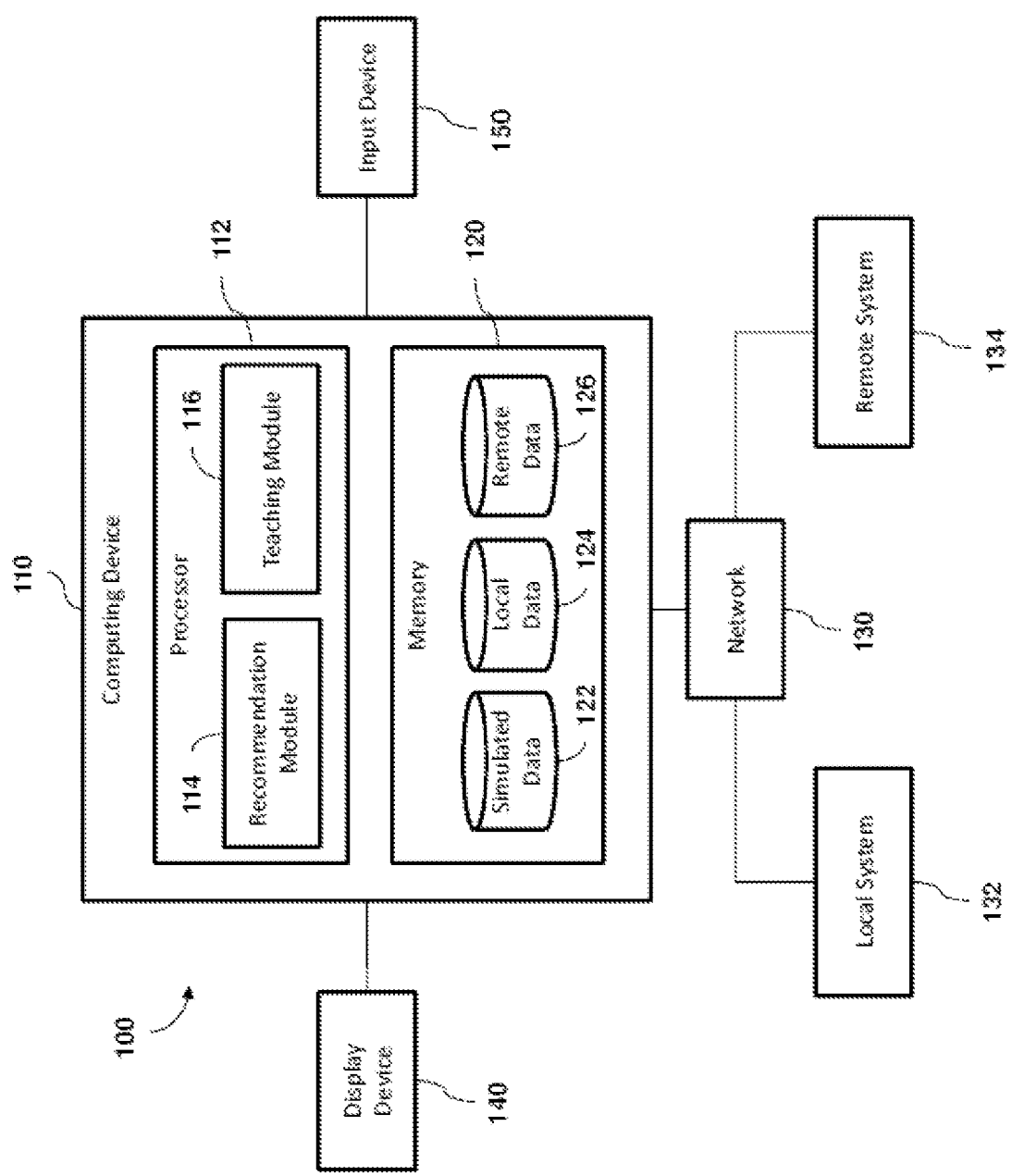
FIG. 1 is a diagrammatic, schematic view of a system according to an embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Systems, devices, and methods described herein are directed to train novice users in a virtual manner on how to obtain various types of intravascular information (e.g., pressure, flow, imaging, etc.) and how to evaluate the data to make decisions regarding therapy. Because the training can be completed in an offline, virtual manner, this disclosure allows safe preparation for users until they are ready to handle cases involving live patients. This invention also allows trainees to learn how to use individual data elements that are currently available (2-D anatomy, 3-D anatomy, FFR/iFR technology) in a simulated fashion to optimize their skills before performing procedures on an actual patient as is the current process. The aspects described here also facilitate goals of the Accreditation Council for Graduate Medical Education for outcome-based and proficiency-based assessment methods. Use of such methods in medicine has grown recently, fueled by the public's concerns over medical errors.

Referring to FIG. 1, shown therein is a system 100 according to an embodiment of the present disclosure. The system 100 includes a computing device 110 having a processor 112 and a memory 120, a network 130 in communication with a local system 132 and a remote system 134, a display device 140, and an input device 150. The system 100 can be configured to teach, train, and/or otherwise educate a user to perform an diagnostic and/or therapeutic intravascular procedure, including which data to collect, where to collect the data, which intervention to perform, where to perform the intervention, etc. In that regard, the system 100 may be used to teach the user to perform an intravascular procedure on the vasculature or the vascular system of a patient. The teaching can include how to diagnose, evaluate, determine, plan, and/or modify a clinical response to a stenosis, blockage, or other obstruction to the flow of fluid. For example, a clinician can use the system 100 to simulate assessment of the heart and/or one or more coronary arteries. The system 100 can also be used to simulate assessment of various cerebrovascular vessels and/or peripheral vessels, including the legs, kidneys, aorta, brain, etc. The system 100 is configured to access teaching data, such as real data from past procedure or simulated data.

The system 100 is configured to determine the order and types of external and/or intravascular data that should be collected to allow the user to make an informed decision on how to treat the stenosis. The system 100 is further configured to determine which therapeutic intervention should be used and the location for those interventions. The system 100 is configured to guide the user through a simulated intravascular procedure and provide feedback in response on the user's clinical choices.

The computing device 110 is generally representative of any device suitable for performing the processing and analysis techniques disclosed herein. In some embodiments, the computing device 110 includes the processor 112 and memory 120. The computing device 110 can include random access memory and/or tangible, non-transitory, computer-readable storage media. The computing device 110 is programmed to execute steps associated with teaching and evaluating simulated intravascular procedures, described herein. Accordingly, it is understood that any steps related to receiving user input, data processing, determining intravascular procedure recommendations, outputting recommendations, feedback, intravascular data, etc., and/or other processing or control aspects of the present disclosure may be implemented by the computing device using corresponding instructions stored on or in non-transitory computer readable media accessible by the computing device.

In some instances, the computing device 110 is a stand-alone device, such as a personal computer, mobile device, etc. For example, the computing device 110, the display device 140, and/or the input device 150 can be integrated into a single device. In such embodiments, the teaching and evaluation methods described herein can be advantageously implemented in a readily accessible, offline, and/or transportable manner. This allows novice users to practice intravascular procedures in a variety of settings without mobility being limited by attached physical devices. In some instances, the computing device 110 is a console device. In some particular instances, the computing device 110 is similar to the s5™ Imaging System or the s5i® Imaging System, each available from Volcano Corporation. In some instances, the computing device 110 is portable (e.g., handheld, on a rolling cart, etc.). In some instances, all or a portion of the computing device 110 can be implemented as a bedside controller such that one or more processing steps described herein can be performed by processing component(s) of the bedside controller. An exemplary bedside controller is described in U.S. Provisional Application No. 62/049,265, titled "Bedside Controller for Assessment of Vessels and Associated Devices, Systems, and Methods," and filed Sep. 11, 2014, the entirety of which is hereby incorporated by reference herein. Further, it is understood that in some instances the computing device 110 comprises a plurality of computing devices. In that regard, it is particularly understood that the different processing and/or control aspects of the present disclosure may be implemented separately or within predefined groupings using a plurality of computing devices. Any divisions and/or combinations of the processing and/or control aspects described below across multiple computing devices are within the scope of the present disclosure.

The memory 120 can include one or more data stores or databases associated with different types of intravascular data, such as simulated data 122, local data 124, and remote data 126. Intravascular data from a local medical facility can be stored in local data 124. Intravascular data from a remote medical facility can be stored in remote data 126. The intravascular data from local or remote medical facilities may be real patient data that has selected to be included in training new user. For example, the primary operator of a catheterization lab can gather teaching cases from existing data sets (e.g., from local or remote facilities). Simulated data generated by the computing device 110 and/or another computing device can be stored in simulated data 122. In some instances, the simulated data is similar to the real data, while in other embodiments, the simulated data explores clinical conditions that are not present in the set of real intravascular data.

The computing device 110 uses one or more types of data to guide users through a simulated diagnostic and/or therapeutic procedure. Generally, the stored data includes intravascular diagnostic information. For example, the stored data can include physiology measurements, such as pressure-related vales, flow-related values, temperature-related values, etc. Pressure-related values can include FFR (e.g., a pressure ratio value calculated as a first instrument is moved through a vessel relative to a second instrument, including across at least one stenosis of the vessel), Pd/Pa (e.g., a ratio of the pressure distal to a lesion to the pressure proximal to the lesion), iFR (e.g., a pressure ratio value calculated using a diagnostic window relative to a distance as a first instrument is moved through a vessel relative to a second instrument, including across at least one stenosis of the vessel), etc. Flow-related values can include coronary flow reserve or CFR (e.g., maximum increase in blood flow through the coronary arteries above the normal resting volume), basal stenosis resistance index (BSR), etc. The stored data can also include external imaging data, such as X-ray, MM, CT scans, single-photon emission computed tomography (SPECT), fluoroscopy, angiography, etc. The stored data can additionally include intravascular imaging data, such as IVUS, FL-IVUS, OCT, thermal, and/or other imaging techniques. The imaging data can be visualized in the form of two-dimensional and/or three-dimensional images of the heart, blood vessel, and/or other anatomy.

The stored data can also include intravascular information based on the physiology measurements and/or imaging data. For example, stored data can include co-registration information, in which physiology measurements and/or imaging data is correlated or co-registered to a location with the patient's vasculature. Spatial co-registration is disclosed in U.S. Pat. No. 7,930,014, titled "VASCULAR IMAGE CO-REGISTRATION," which is hereby incorporated by reference in its entirety. Diagnostic information and/or data is correlated to vessel images can be co-registered using techniques similar to those described in U.S. Provisional Patent Application No. 61/747,480, titled "SPATIAL CORRELATION OF INTRAVASCULAR IMAGES AND PHYSIOLOGICAL FEATURES" and filed Dec. 31, 2012, which is hereby incorporated by reference in its entirety. In some embodiments, co-registration and/or correlation can be completed as described in U.S. Provisional Patent Application No. 61/856,509, titled "DEVICES, SYSTEMS, AND METHODS FOR ASSESSMENT OF VESSELS" and filed Jul. 19, 2013, which is hereby incorporated by reference in its entirety. In some embodiments, diagnostic information and/or data is correlated to vessel images using techniques similar to those described in U.S. patent application Ser. No. 14/144,280, titled "DEVICES, SYSTEMS, AND METHODS FOR ASSESSMENT OF VESSELS" and filed Dec. 31, 2012, which is hereby incorporated by reference in its entirety. In some embodiments, co-registration and/or correlation can be completed as described in U.S. Provisional Patent Application No. 61/856,509, titled "DEVICES, SYSTEMS, AND METHODS FOR ASSESSMENT OF VES- SELS" and filed Jul. 19, 2013, which is hereby incorporated by reference in its entirety. In other embodiments, co-registration and/or correlation can be completed as described in International Application No. PCT/IL2011/000612, titled "CO-USE OF ENDOLUMINAL DATA AND EXTRALUMINAL IMAGING" and filed Jul. 28, 2011, which is hereby incorporated by reference in its entirety. Further, in some embodiments, co-registration and/or correlation can be completed as described in International Application No. PCT/IL2009/001089, titled "IMAGE PROCESSING AND TOOL ACTUATION FOR MEDICAL PROCEDURES" and filed Nov. 18, 2009, which is hereby incorporated by reference in its entirety. Additionally, in other embodiments, co-registration and/or correlation can be completed as described in U.S. patent application Ser. No. 12/075,244, titled "IMAGING FOR USE WITH MOVING ORGANS" and filed Mar. 10, 2008, which is hereby incorporated by reference in its entirety.

The stored data can also include results from processing the diagnostic information, such as the morphology of tissue, plaque structure, plaque composition, etc. Methods and systems for recognizing tissues and tissue types in both diagnostic and therapeutic applications are described, for example, in U.S. patent application Ser. No. 14/209,915, "PARALLELIZED TREE-BASED PATTERN RECOGNITION FOR TISSUE CHARACTERIZATION," filed Mar. 13, 2014; U.S. Pat. No. 6,200,268 entitled "VASCULAR PLAQUE CHARACTERIZATION;" U.S. Pat. No. 6,381,350 entitled "INTRAVASCULAR ULTRASONIC ANALYSIS USING ACTIVE CONTOUR METHOD AND SYSTEM;" U.S. Pat. No. 7,074,188 entitled "SYSTEM AND METHOD OF CHARACTERIZING VASCULAR TISSUE;" U.S. Pat. No. 7,175,597 entitled "NON-INVASIVE TISSUE CHARACTERIZATION SYSTEM AND METHOD;" U.S. Pat. No. 7,215,802 entitled "SYSTEM AND METHOD FOR VASCULAR BORDER DETECTION;" U.S. Pat. No. 7,359,554 entitled "SYSTEM AND METHOD FOR IDENTIFYING A VASCULAR BORDER;" U.S. Pat. No. 7,627,156 entitled "AUTOMATED LESION ANALYSIS BASED UPON AUTOMATIC PLAQUE CHARACTERIZATION ACCORDING TO A CLASSIFICATION CRITERION;" and U.S. Pat. No. 7,988,633 entitled "APPARATUS AND METHOD FOR USE OF RFID CATHETER INTELLIGENCE," the entireties of which are hereby incorporated by reference herein.

The computing device 110 can include one or more software modules 114 and 116. The software modules can include computer executable instructions associated with performing functions described herein. The computer executable instructions can be implemented by the processor, such as by accessing and processing data stored in the memory 120. The recommendation module 114 includes computer instructions for generating diagnostic and therapeutic recommendations to the user based on the stored intravascular data, as well as for generating and outputting display data associated with the recommendations. For example, using one or more of the stored data types, the recommendation module 114 can suggest which additional types of intravascular data to collect, where the intravascular data should be collected, which therapeutic intervention to pursue, one or more parameters associated the intervention, where the therapy should be directed, etc. Determination of diagnostic and/or therapeutic recommendations is described, for example, in U.S. Provisional Application No. 62/080,023, titled "PERCUTANEOUS CORONARY INTERVENTION (PCI) PLANNING INTERFACE AND ASSOCIATED DEVICES, SYSTEMS, AND METHODS," and filed Nov. 14, 2014; U.S. Provisional Application No. 62/089,039, titled "DEVICES, SYSTEMS, AND METHODS FOR VESSEL ASSESSMENT AND INTERVENTION RECOMMENDATION," and filed Dec. 8, 2014; U.S. Provisional Application No. 62/089,051, titled "BEDSIDE INTERFACE FOR PERCUTANEOUS CORONARY INTERVENTION PLANNING," and filed Dec. 8, 2014; U.S. Provisional Application No. 62/089,062, titled "PATIENT EDUCATION FOR PERCUTANEOUS CORONARY INTERVENTION TREATMENTS," and filed Dec. 8, 2014; U.S. Provisional Application No. 62/090,251, titled "DEVICES, SYSTEMS, AND METHODS FOR IN-STENT RESTENOSIS PREDICTION," and filed Dec. 10, 2014; U.S. Provisional Application No. 62/080,045, titled "PERCUTANEOUS CORONARY INTERVENTION (PCI) PLANNING INTERFACE WITH PRESSURE DATA AND VESSEL DATA AND ASSOCIATED DEVICES, SYSTEMS, AND METHODS," and filed Nov. 14, 2014; U.S. Provisional Application No. 62/089,073, titled "DEVICES, SYSTEMS, AND METHODS FOR DETECTING ANOMALOUS CARDIAC WAVEFORMS AND MAKING PHYSIOLOGIC MEASUREMENT CALCULATIONS," and filed Dec. 8, 2014; U.S. Provisional Application No. 62/089,080, titled "DIAGNOSTIC AND IMAGING DIRECTION BASED ON ANATOMICAL AND/OR PHYSIOLOGICAL PARAMETERS," and filed Dec. 8, 2014; U.S. Provisional Application No. 62/089,090, titled "AUTOMATED IDENTIFICATION AND CLASSIFICATION OF INTRAVASCULAR LESIONS," and filed Dec. 8, 2014; U.S. Provisional Application No. 62/089,119, titled "INTERACTIVE PHYSIOLOGIC DATA AND INTRAVASCULAR IMAGING DATA AND ASSOCIATED DEVICES, SYSTEMS, AND METHODS," and filed Dec. 8, 2014; U.S. Provisional Application No. 62/089,125, titled "INTERACTIVE CARDIAC TEST DATA AND ASSOCIATED DEVICES, SYSTEMS, AND METHODS," and filed Dec. 8, 2014, U.S. Provisional Application No. 61/895,909, titled "DEVICES, SYSTEMS, AND METHODS FOR VESSEL ASSESSMENT," and filed Oct. 25, 2013; and U.S. Provisional Application No. 61/942,338, titled "DEVICES, SYSTEMS, AND METHODS AND ASSOCIATED DISPLAY SCREENS FOR ASSESSMENT OF VESSELS," and filed Feb. 20, 2014; the entireties of which are hereby incorporated by reference herein.

The teaching module 114 includes computer instructions for facilitating an interactive, simulated intravascular procedure based on the stored intravascular data, as well as generating and outputting associated display data. The computer instructions can comprise an algorithm that is operable to grade a user's selection of what data to gather, where to gather data, how to would grade. For example, the teaching module 114 can generate prompts, questions, and feedback for the simulated intravascular procedure. For example, the teaching module 114 can guide a user through the intravascular procedure by asking which additional data to collect, which treatment to pursue, etc., and providing positive and/or negative feedback to the user's response.

The system 100 includes a display device 140 that is communicatively coupled to the computing device 110. In some embodiments, the display device 140 is a component of the computing device 110, while in other embodiments, the display device 140 is distinct from the computing device 110. In some embodiments, the display device 140 is implemented as a bedside controller having a touch-screen display as described, for example, in U.S. Provisional Application No. 62/049,265, titled "Bedside Controller for Assessment of Vessels and Associated Devices, Systems, and Methods,"

and filed Sep. 11, 2014, the entirety of which is hereby incorporated by reference herein. In some embodiments, the display device 140 is a monitor integrated in a console device or a standalone monitor (e.g., a flat panel or flat screen monitor). The computing device 110 can be configured to general visual displays based on the stored intravascular data, display data generated by the recommendation module 114 and/or teaching module 116, etc. Exemplary visual displays (e.g., screen displays outputted by a display device 140, etc.) are illustrated in FIGS. 4-14. The computing device 110 can generate and provide the display data associated with the visual displays to the display device 140.

The system 100 includes an input device 150 that is communicatively coupled to the computing device 110. The input device permits a user to interact with the visual displays outputted by the display device 140. For example, the user can provide a user input to select, modify, and/or manipulate all or a portion of the visual display using the input device. In some embodiments, user interface device 150 is a separate component from the display device 140. The input device can also be any peripheral device, include a touch sensitive pad, keyboard, mouse, trackball, etc. In other embodiments, the user interface device is part of the display device 180. For example, the user interface device can be implemented as a bedside controller having a touch-screen display as described, for example, in U.S. Provisional Application No. 62/049,265, titled "Bedside Controller for Assessment of Vessels and Associated Devices, Systems, and Methods," and filed Sep. 11, 2014, the entirety of which is hereby incorporated by reference herein. In such embodiments, a user input can be a touch input received on the touch sensitive display of the bedside controller. The computing device 110 can receive data representative of the user input from the input device 150.

In some instances, such as when the computing device 110 is a console device, intravascular devices can be operatively coupled thereto. For example, any form of device, instrument, or probe sized and shaped to be positioned within a vessel is contemplated. For example, a guide wire and/or a catheter can be coupled to the computing device 110. In that regard, the one or more instruments may be used to teach how data is obtained within a simulated vessel. The instrument(s) one or more sensors, transducers, and/or other monitoring elements configured to obtain the diagnostic information about the vessel including one or more of pressure, flow (velocity and/or volume), images (including images obtained using ultrasound (e.g., IVUS), OCT, thermal, and/or other imaging techniques), temperature, other diagnostic information, and/or combinations thereof.

The system 100 can include various connectors, cables, interfaces, connections, etc., to communicate between the computing device 110, the display device 150, and/or the input device 160. The illustrated communication pathways are exemplary in nature and should not be considered limiting in any way. In that regard, it is understood that any communication pathway between the components of system 100 may be utilized, including physical connections (including electrical, optical, and/or fluid connections), wireless connections, and/or combinations thereof. In that regard, it is understood that the one or more of the components of the system 100 can communicate via a wireless connection in some instances. In some instances, the one or more components of the system 100, such as the computing device 110, and/or the system 100 and other systems (e.g., of a hospital or health services provider) communicate via a communication link over a network 130 (e.g., intranet, internet, telecommunications network, and/or other network). For example, the computing device 110 can be in communication with the local system 132 and/or the remote system 134 via the network 130. The computing device 110 can access local intravascular data and/or remote intravascular data from the local system 132 and/or the remote system 134, respectively, to be used as teaching data. Various communication configurations are described, for example, in U.S. Provisional Application No. 62/080,023, "PERCUTANEOUS CORONARY INTERVENTION (PCI) PLANNING INTERFACE AND ASSOCIATED DEVICES, SYSTEMS, AND METHODS," filed Nov. 14, 2014, and U.S. Provisional Application No. 62/080,045, "PERCUTANEOUS CORONARY INTERVENTION PLANNING (PCI) PLANNING INTERFACE WITH PRESSURE DATA AND VESSEL DATA AND ASSOCIATED DEVICES, SYSTEMS, AND METHODS," filed Nov. 14, 2014, the entireties of which are hereby incorporated by reference herein.

Figure 2:
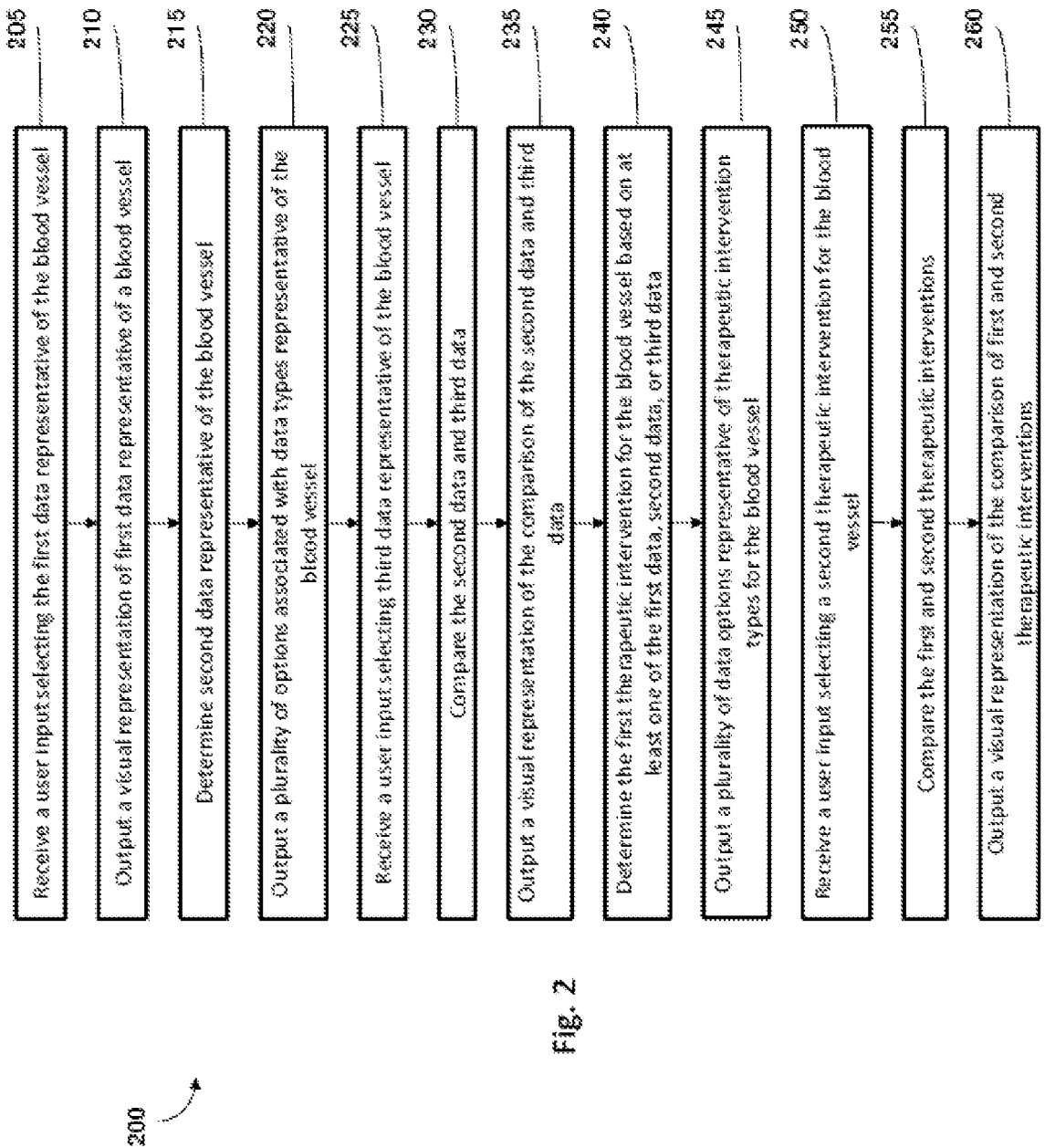
FIG. 2 is a flow diagram of a method of simulating an intravascular procedure according to an embodiment of the present disclosure.

FIG. 2 is a flow diagram illustrating a method 200 of simulating an intravascular procedure. The method 200 can also be described as a method of intravascular procedure training. As illustrated, the method 200 includes a number of enumerated steps, but embodiments of the method 200 may include additional steps before, after, and in between the enumerated steps. In some embodiments, one or more of the enumerated steps may be omitted or performed in a different order. One or more steps of the method 200 can be carried out by one or more components of the system 100, including the computing device 110, the display device 140, and/or the input device 150 (FIG. 1).

At step 205, the method 200 includes receiving, at the input device in communication with the computing device, a user input selecting the first data representative of the blood vessel. In that regard, the computing device can receive a signal representative of user input from the input device. Step 205 can represent in some instances an early step in the simulated intravascular procedure, during which the user is initially introduced to the blood vessel that the user will evaluate and treat. In some embodiments, the first data can be external images of the blood vessel, such as fluoroscopic and/or angiographic images. In other embodiments, the first data can be physiology values (e.g., pressure values, flow values, etc.), intravascular images, co-registered data, and/or other suitable intravascular information. At step 210, the method 200 includes outputting, from a computing device to a display device in communication with the computing device, a visual representation of first data representative of a blood vessel. For example, two dimensional and/or three dimensional images of the blood vessel can be displayed. In other embodiments, suitable representations of physiology data, such as charts, graphs, numerical values, etc., can be presented.

At step 215, the method 200 includes determining, using the computing device, second data representative of the blood vessel. In that regard, step 215 can include a determination of what type of data should be next collected in order for the user to determine the appropriate therapeutic intervention. For example, if angiographic/fluoroscopic data is presented in steps 205 and 210, then the computing device can determine that pressure values associated with blood flow within the vessel should be obtained. In that regard, the first and second data are capable of being used to determine a first therapeutic intervention for the blood vessel. Additionally, the computing device may determine type(s) of data that will likely not be helpful in determining the appropriate therapeutic intervention. As described below, by comparing the user's selection of data to obtain to the computing device's determination, feedback that grades or teaches the user can be provided. In some embodiments, step 215 can be generally described as the computing device determining a first course of action based on the first visual representation of the vessel. For example, the first course of action can be a diagnostic procedure (such as obtaining pressure, flow, imaging, and/or other types of data about vasculature) or a therapeutic procedure (such as a percutaneous coronary intervention CABG, etc.), as described herein.

At step 220, the method 200 includes outputting, from the computing device to the display device, a plurality of options associated with data types representative of the blood vessel. For example, different types of available data (e.g., real data collected from the patient, simulated data generated by the computing device) can be displayed, including angiogram data, fluoroscopy data, pressure data, flow data, imaging data, disease quantification data (e.g., SYNTAX score), virtual histology data, and co-registration data, etc. At step 225, the method 200 includes receiving, at an input device in communication with the computing device, a user input selecting third data representative of the blood vessel. In some embodiment, the receiving a user input selecting third data includes receiving selection of at least one of the plurality of data options. At steps 220 and 225, a user works through the simulated intravascular procedure by selecting what additional data should be collected to determine the appropriate therapeutic intervention. Step 225 can generally be described as receiving, at an input device in communication with the computing device, a user input associated with a second course of action. In different circumstances, the second course of action may be a diagnostic (e.g., collecting additional data associated with vasculature) or therapeutic procedure (e.g., treating a lesion or stenosis associate with the vasculature).

At step 230, the method 200 includes comparing the second and third data. In some embodiments, the comparing includes determining if the third data is the same as the second data. That is, the computing device can determine if the user's selection of the next data to obtain is the same as the computing device's recommendation. Step 230 can be generally described as comparing, using the computing device, the first and second courses of action. In some contexts, the first and second courses of action are both diagnostic procedures, both therapeutic procedure, and/or a combination of diagnostic and therapeutic procedures. At step 235, the method 200 includes outputting, from the computing device to the display, a visual representation of the comparison of the second data and third data. The step 235 can generally be described as outputting, from the computing device to the display, a comparison of the first and second courses of action. In some instances, the outputting includes at least one of: providing a visual representation indicating that the third data is the same as the second data; or providing a visual representation indicating that the third data is the different than the second data. That is, the computing device can provide positive or negative feedback to the user based on the comparison of the second data (determined by the computing device) and third data (selected by the user). The visual representation can include text, symbols, and/or other visual or audible indications. For example, if the third data selected by the user is not likely to be useful in determining the appropriate therapeutic intervention, the computing device can generate and output negative feedback. The computing device in some instances provide hints or notes to guide the user towards obtaining data that is more useful in evaluating the stenosis, determining the appropriate therapeutic intervention, etc. For example, if the second and third data are the same, then the computing device can output positive feedback. In some instances, even if the second and third data are different, the computing device can output positive feedback if the third data type (selected by the user) would be beneficial in evaluating the stenosis, determining the appropriate therapeutic intervention, etc. The outputted feedback can be neutral and/or otherwise instructional to the user in other circumstances.

At step 240, the method 200 includes determining the first therapeutic intervention for the blood vessel based on at least one of the first data, second data, or third data. In some circumstances, the therapeutic intervention can be described as a course of action determined by the computing device. In that regard, the computing device can assess the effect of a stenosis on blood flow, based on the stored data, and determine a recommended intervention. For example, if the stenosis occludes a moderate amount of blood flow within the vessel, then the computing device may recommend a percutaneous coronary intervention (PCI). For example, if the stenosis blocks a significant portion of the vessel and the patient history suggests that surgery is not infeasible, then the computing device can suggest a coronary artery bypass grafting (CABG). Additionally, the computing device may determine type(s) of intervention that will likely not be successful in treating the stenosis. As described below, by comparing the user's selection of an intervention to the computing device's determination, feedback that grades or teaches the user can be provided.

At step 245, the method 200 includes outputting, from the computing device to the display device, a plurality of data options representative of therapeutic intervention types for the blood vessel. For example, the therapeutic intervention types can include angioplasty, stenting, and coronary artery bypass grafting (CABG). In some embodiments, "no intervention" or "wait and assess" is provided as an option. At step 250, the method 200 includes receiving, at the input device in communication with the computing device, a user input selecting a second therapeutic intervention for the blood vessel. In some instances, the receiving a user input selecting a second therapeutic intervention includes receiving selection of at least one of the plurality of data options. In some circumstances, the therapeutic intervention can be described as a course of action received based on a user input. At steps 245 and 250, a user works through the simulated intravascular procedure by selecting what therapeutic intervention should be employed to treat the occluded blood vessel.

At step 255, the method 200 includes comparing, using the computing device, the first and second therapeutic interventions. In some instances, the comparing includes determining if the first and second therapeutic interventions are the same. That is, the computing device can determine if the user's selected intervention the same as the computing device's recommendation (or, in the case of real data, how the patient was actually treated). At step 260, the method 200 includes outputting, from the computing device to the display, a visual representation of the comparison of first and second therapeutic interventions. In some instances the outputting includes at least one of: providing a visual representation indicating that the first and second therapeutic interventions are the same; or providing a visual representation indicating that first and second therapeutic interventions are different. That is, the computing device can provide positive or negative feedback to the user based on the comparison the first intervention (determined by the computing device) and the second therapeutic intervention (selected by the user). The visual representation can include text, symbols, and/or other visual or audible indications. For example, if the second intervention selected by the user is not likely to be useful in treating the stenosis, the computing device can generate and output negative feedback. The computing device in some instances provides hints or notes to guide the user towards selecting an appropriate intervention. For example, if the first and second interventions are the same, then the computing device can output positive feedback. In some instances, even if the first and second interventions are different, the computing device can output positive feedback if the second intervention (selected by the user) is medically appropriate or justifiable. In that regard, the computing device can access other teaching cases to determine how other patients were treated under similar circumstances.

In some embodiments, the method 200 can include additional steps, such as receiving user input selecting one or more parameters for an interventional procedure (e.g., stent length, stent diameter, stent material, stent type, stent position, etc.). The method 200 can include determining feedback for the selected parameters. For example, the feedback can be based on a predicted efficacy of the intervention with the selected parameter(s). The method 200 can also include outputting a visual representation of the feedback.

Figure 3:
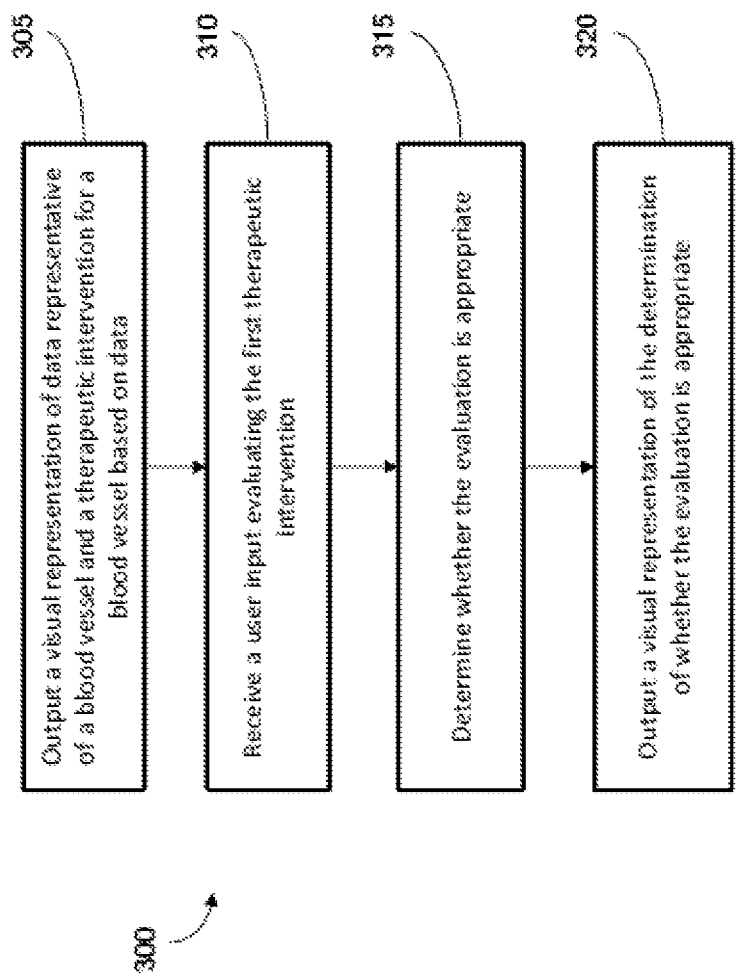
FIG. 3 is a flow diagram of a method of evaluating an intravascular procedure according to an embodiment of the present disclosure.

FIG. 3 is a flow diagram illustrating a method 300 of evaluating an intravascular procedure. The method 300 can also be described as a method of intravascular procedure training. As illustrated, the method 300 includes a number of enumerated steps, but embodiments of the method 300 may include additional steps before, after, and in between the enumerated steps. In some embodiments, one or more of the enumerated steps may be omitted or performed in a different order. One or more steps of the method 300 can be carried out by one or more components of the system 100, including the computing device 110, the display device 140, and/or the input device 150 (FIG. 1).

At step 305, the method 300 includes outputting, from a computing device to a display device in communication with the computing device, a visual representation of: data representative of a blood vessel; and a therapeutic intervention for a blood vessel based on data. One or more types of intravascular data, such as physiologic measurements (pressure, flow, etc.), external and intravascular imaging, and other suitable data, can be displayed. The step 305 can include the computing device determining a recommended intervention. The recommended intervention, along with one or more parameters associated with the intervention (e.g., location, etc.), can be output to the display device. Step 305 can include the user being advised of the available data and what the system would have recommended with such data.

At step 310, the method 300 includes receiving, at an input device in communication with the computing device, a user input evaluating the therapeutic intervention. For example, the user can provide input as to whether or not the user agrees with the system's recommendation. The user can additionally provide reasons as to why the user agrees or disagrees with the recommendation. The user may disagree with the system's recommendation when multiple different interventions are medically justified, when the system's algorithm(s) cannot capture all of the nuances in determining the appropriate therapeutic intervention, etc.

At step 315, the method 300 includes determining, using the computing device, whether the evaluation is appropriate. In some instances, the computing device can access data regarding the efficacy of the treatment. For example, if user agrees with the computing device's recommendation, but the treatment was not efficacious, the computing device may determine that the user agreeing the recommendation was not appropriate. If the user disagrees with the computing device's recommendation, but for reasons that are not medically correct, the computing device can determine that the recommendation was not appropriate. At step 320, the method 300 includes outputting, from the computing device to the display device, a visual representation of the determination of whether the evaluation is appropriate. For example, the computing device can output positive or negative feedback based on the determination in step 314. The visual representation can include text, symbols, and/or other visual or audible indications. The feedback can include information about the efficacy of the intervention for the particular data set, an average efficacy of one or more intervention(s) under similar circumstances, etc.

FIGS. 4-13 illustrate visual displays according to exemplary embodiments. All or a portion of the visual displays of FIGS. 4-13 can be two-dimensional and/or two-dimensional representations of three-dimensional models. In that regard, the visual displays can output by the display device 140, such as an external display, a touch screen display device, etc. The computing device 110 can generate display data associated with the visual displays such that the display device 140 is configured to output the visual displays based on the display data.

Figure 4:
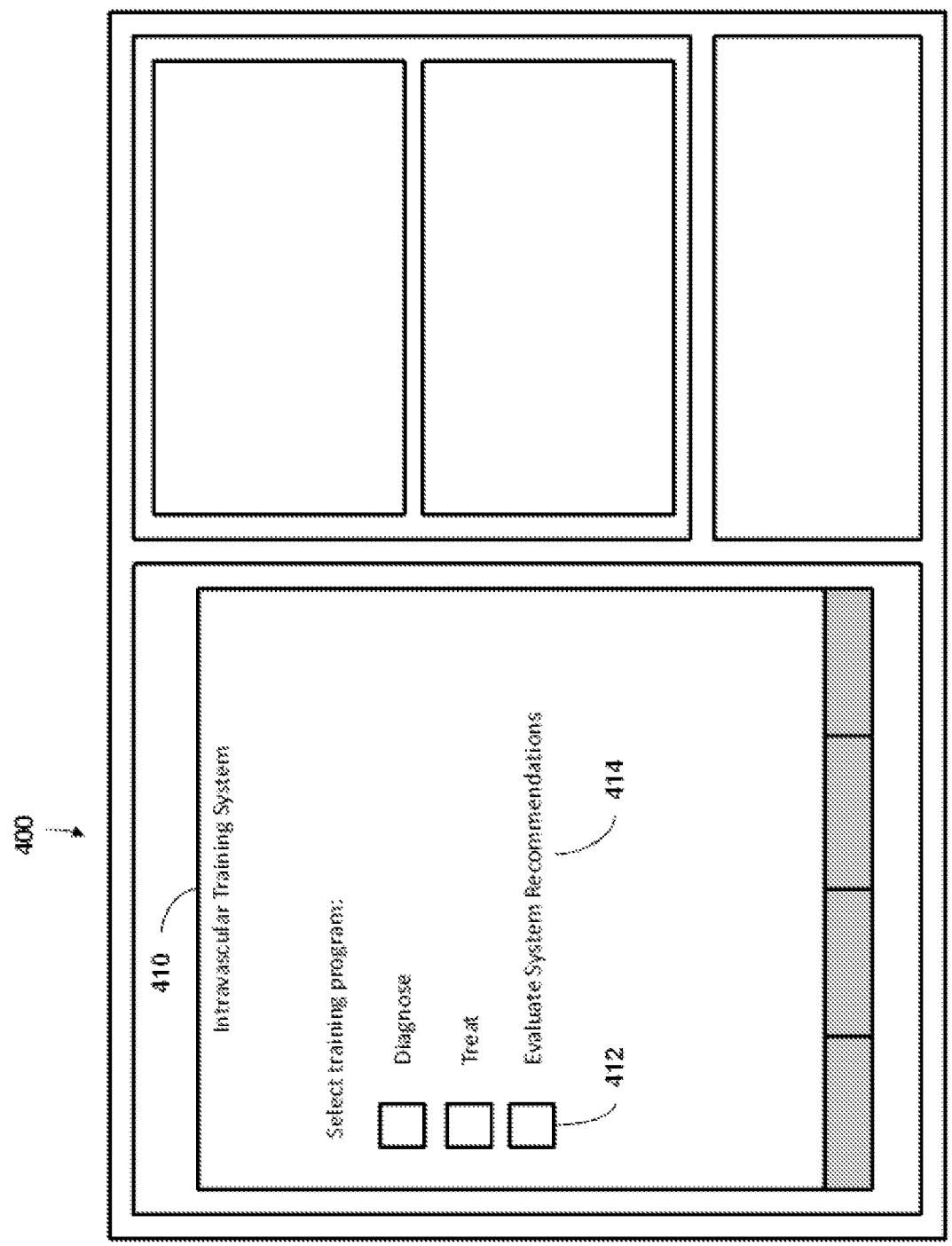
FIG. 4 is a visual display according to an embodiment of the present disclosure.

Referring now to FIG. 4, shown therein a visual display 400. The visual display 400 provides a menu of options 414, within the window 410, to initiate a simulated intravascular procedure. The options can include "diagnose," "treat," "evaluate system recommendations," other suitable programs, and/or combinations thereof. The user can select an option by pressing, clicking, and/or otherwise physically or virtually actuating the box 512. In other embodiments, different user interface elements can be presented such that one or more of the options can be selected differently. Selecting the "diagnose" option allows the user to walk through a diagnostic procedure during which one or more types of data associated with vasculature are collected. Selecting the "treat" option allows the user to walk through an interventional procedure during a particular intervention and one or more parameters associated therewith are selected. In some embodiments, the "diagnose" and "treat" options can be completed together (e.g., as shown and described with respect to FIG. 2). Selecting the "evaluate system recommendations" option allows the user to view collected data and a system recommendation, and determine whether the user agrees or disagrees with the recommendation (as shown and described with respect to FIG. 3).

Figure 5:
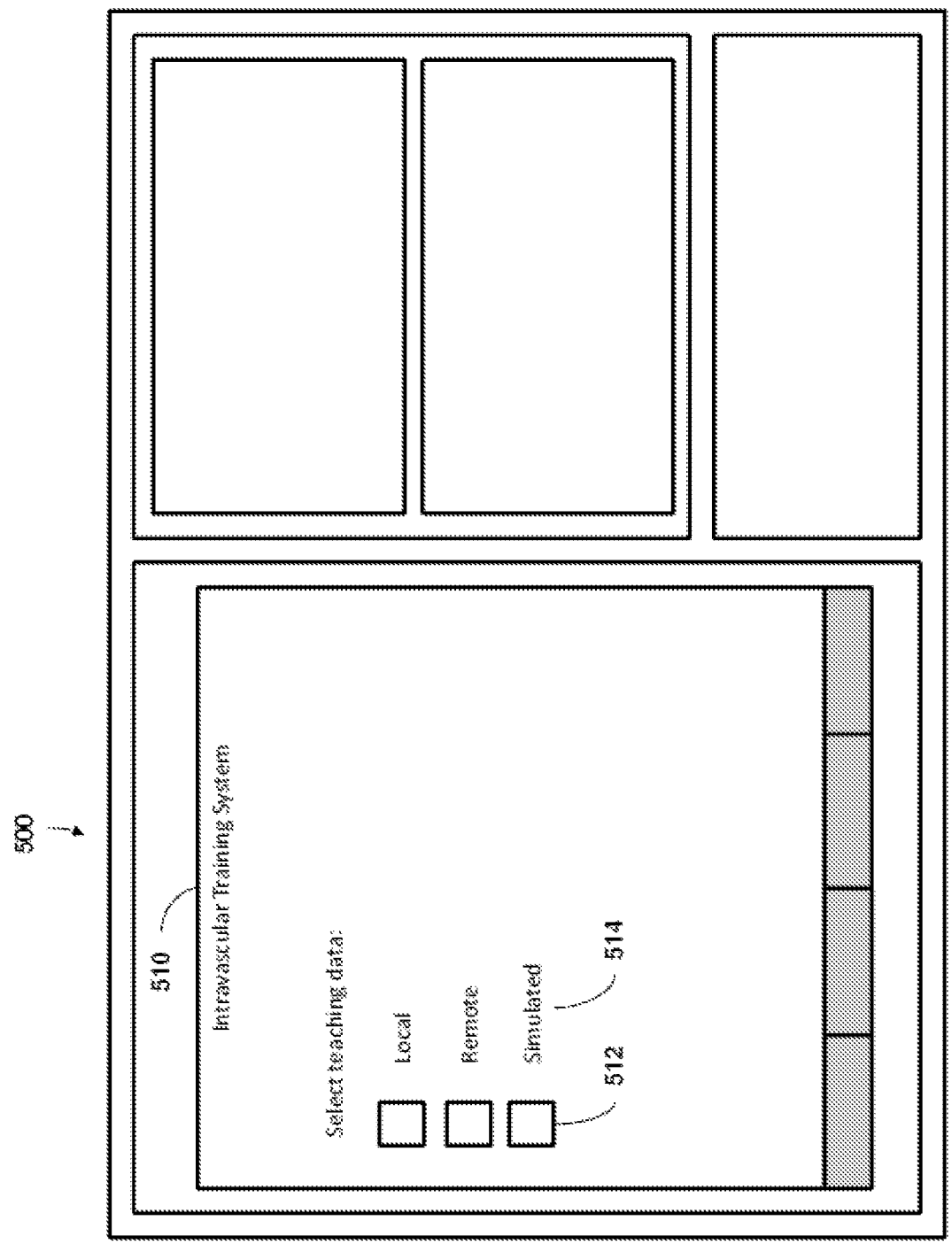
FIG. 5 is a visual display according to another embodiment of the present disclosure.

Referring now to FIG. 5, shown therein is a visual display 500. Visual display 500 can be outputted when any of options 414 (FIG. 4) are selected. The visual display 500 provides a menu of options 514, within the window 510. The options can include "local," "remote," "simulated," other suitable data types, and/or combinations thereof. The user can select an option by pressing, clicking, and/or otherwise physically or virtually actuating the box 512. In other embodiments, different user interface elements can be presented such that one or more of the options can be selected differently. Selecting the local option can access data from a local catheterization laboratory or cath lab and selecting the remote option can access data from one or more remote cath labs. The local and remote data can include real patient data (e.g., with consent, in an anonymous manner) that has been selected for its pedagogical value. For example, a senior clinician has selected certain cases he or she has determined will be useful for teaching novice users. Selecting the simulated option can access data that has been generated by a computing device. The generated data can be based on real data and is intended to replicate realistic clinical circumstances as closely as possible.

Figure 6:
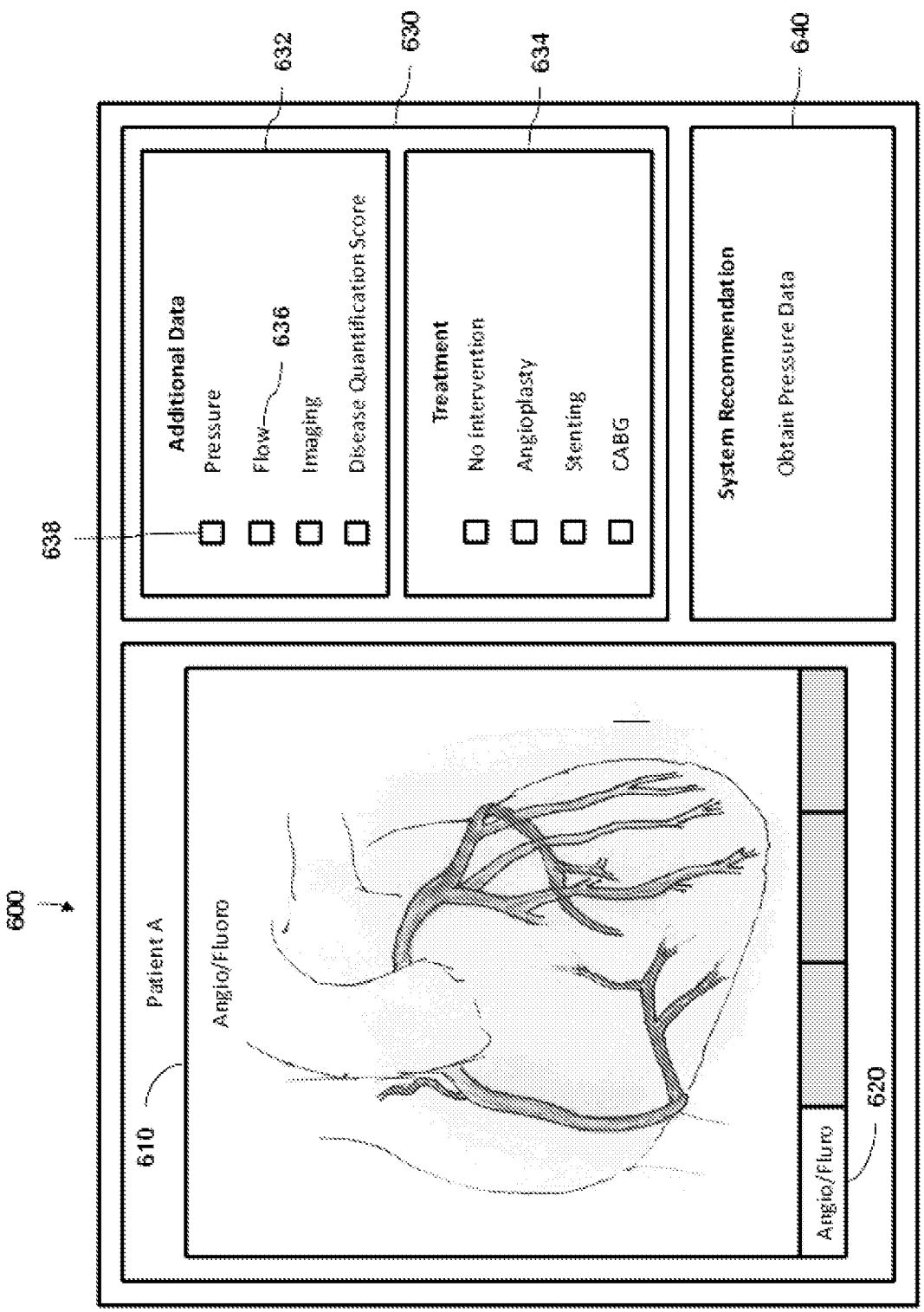
FIG. 6 is a visual display according to another embodiment of the present disclosure.

Referring now to FIG. 6, shown therein a visual display 600. The visual display 600 can be outputted in response to the user selecting the "diagnose" option in visual display 400 (FIG. 4). That is, visual display 600 is part of a diagnostic procedure simulation. The window 610 illustrates an angiographic/fluoroscopic image of the heart and one or more coronary vessels. The active panel 620 labels the type of data being viewed in the window 610. The external imaging data illustrated in FIG. 6 can be associated with "patient A" and may be real data or simulated data, based, e.g., on the user's selection in visual display 500 (FIG. 5).

Figure 7:
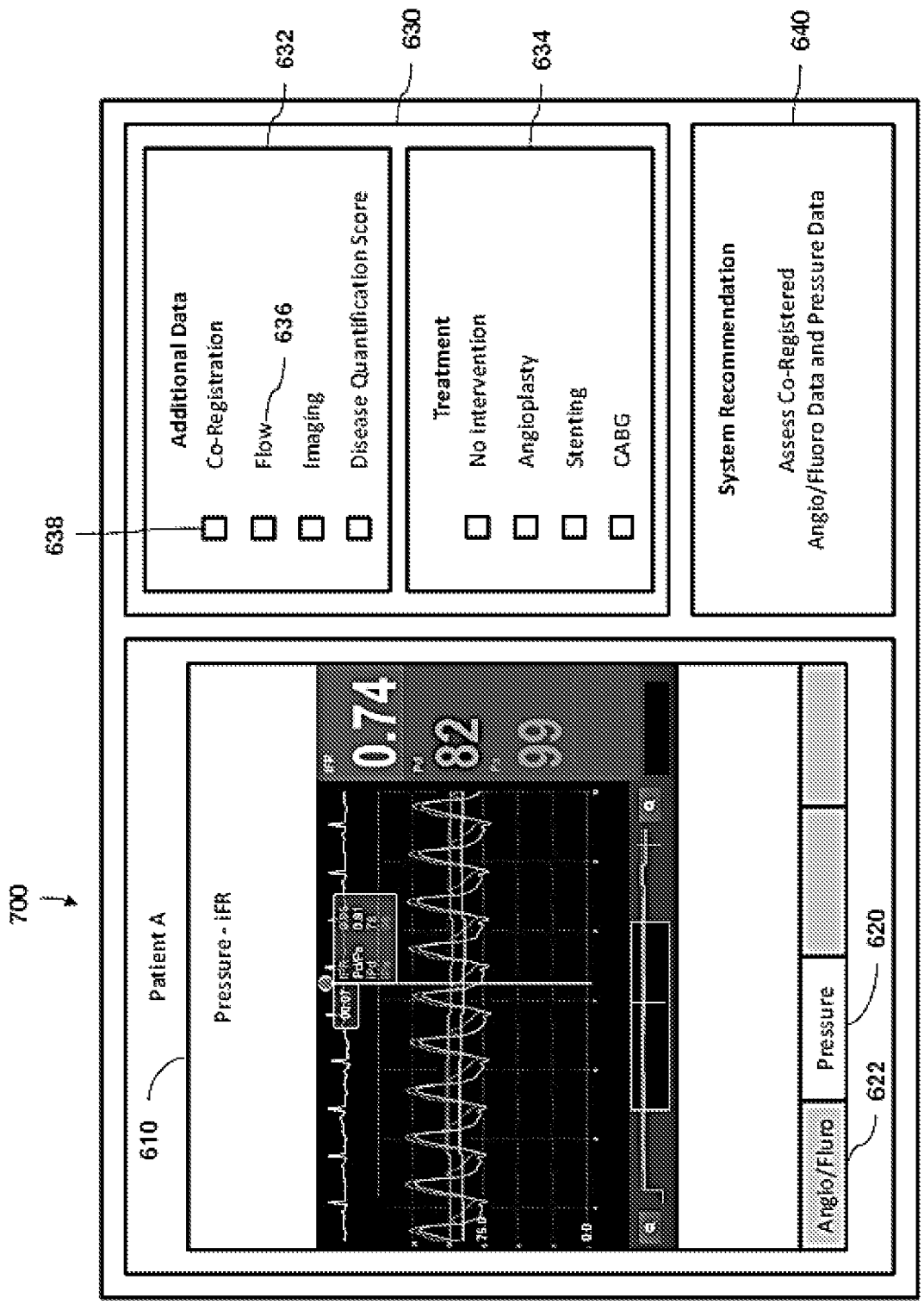
FIG. 7 is a visual display according to another embodiment of the present disclosure.

The visual display 600 includes user input zone 630. The user can provide user input regarding which intravascular data type 636 to obtain in the window 632, and the user can provide user input regarding a particular therapeutic intervention in window 634. For example, after viewing the angiographic/fluoroscopic image shown in the window 610, the user decide to obtain pressure data by pressing, clicking, and/or otherwise physically or virtually actuating the box 638. In other embodiments, different user interface elements can be presented such that one or more of the options can be selected differently. The computing device can evaluate or provide feedback as to the user's selection in the window 640. For example, then computing device can provide positive or negative feedback, and/or otherwise guide the user to select. In the illustrated embodiment, the window 640 is providing guidance to the user to obtain pressure data. In response to the user's selection to obtain pressure data, the computing device accesses the pressure data for "Patient A" and displays it in the window 610, as illustrated in FIG. 7. In some embodiments, the user can indicate the location in the coronary artery at which the pressure data should be obtained, based on the blockage seen in the angiographic/fluoroscopic image. The computing device can evaluate the indicated location and provide feedback as to whether the location is correct or whether/how the location should be modified.

Referring now to FIG. 7, shown therein the visual display 700. The visual display 700 can be outputted in response to the user providing user input to obtain pressure data in the visual display 600 (FIG. 6). The window 610 illustrates pressure waveforms, as well as numerical pressure values (e.g., iFR, Pd, Pa). The user may interact with the pressure data, such as by sliding the waveforms to the left or right to view earlier or later times associated with the pressure data collection. The active panel 620 is labeled "pressure" because the window 610 is displaying pressure data. The inactive panel 622 is partially obscured, such as with grey or other coloring, pattern, sand/or shading to indicate that the data is not being viewed. In other embodiments, the active panel 620 may be accentuated with a coloring, patterning, and/or shading to indicate that the data is being viewed. In some embodiments, the visual display 700 can simultaneously display (e.g., in a side-by-side configuration) multiple windows with different types of data. For example, the angiographic/fluoroscopic data may be displayed in a window next to a window illustrating the pressure data.

Figure 8:
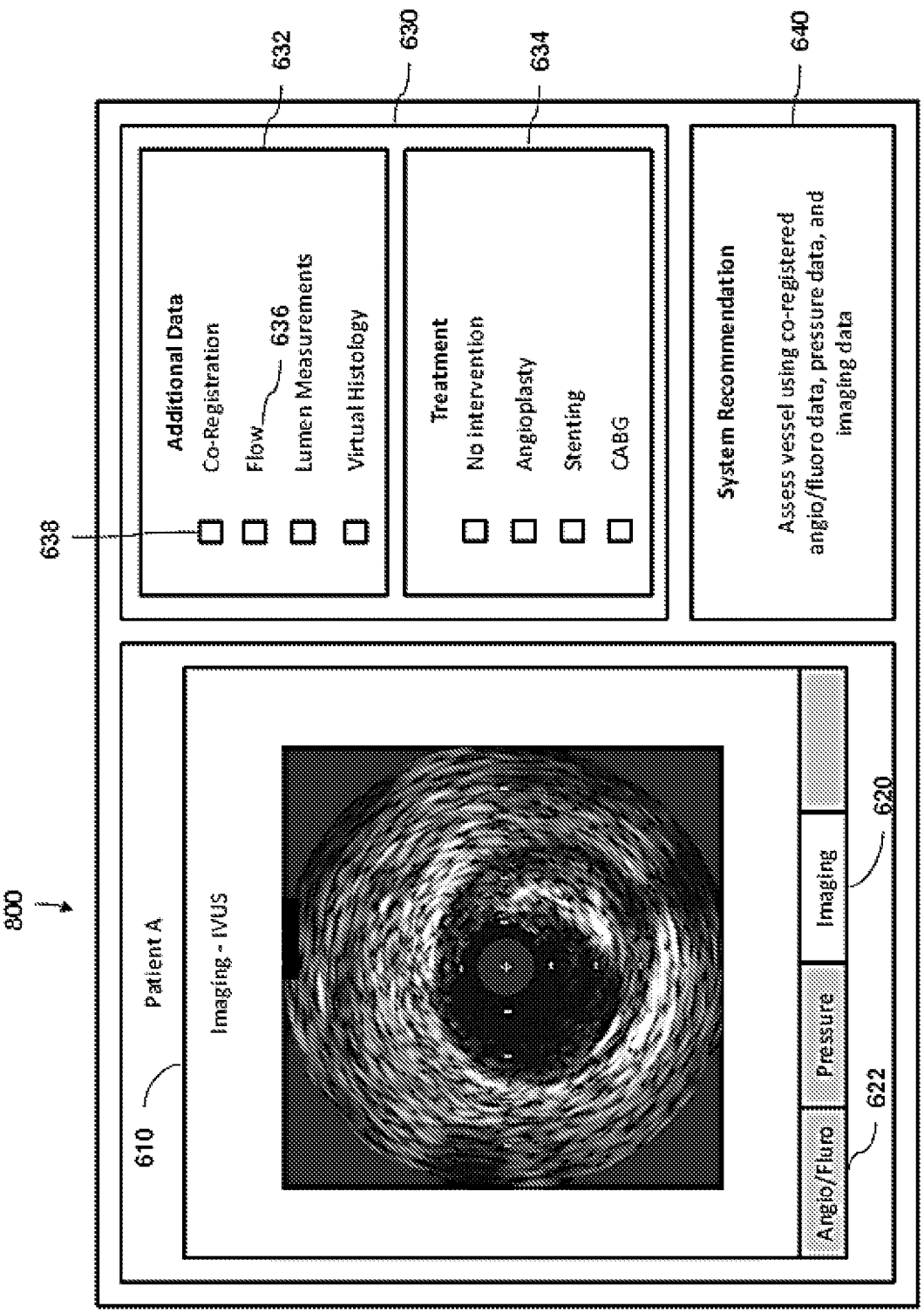
FIG. 8 is a visual display according to another embodiment of the present disclosure.

The user can obtain additional data by selecting another of the options 636 in the window 632. In that regard, user may select which intravascular data type to obtain based on the feedback or guidance provided in the window 640. In some circumstances, the user may select different option than the recommended option. The computing device can output the user's selected option if it is a medically justifiable choice. For example, the user can provide user input to obtain intravascular imaging data even though the system recommends viewing co-registered angiographic/fluoroscopic data and pressure data. Intravascular imaging data can be outputted (as shown in FIG. 8) if the computing system determines that viewing, e.g., an IVUS image of the lesion or stenosis will assist in determining the correct treatment. Corresponding positive or neutral feedback can be displayed in the window 640. If the user selects a data type that will not be useful in determining the correct treatment, the window 640 can provide negative feedback and guidance to teach the user to select the correct data type in the future.

Referring now to FIG. 8, shown therein the visual display 800. The visual display 800 can be outputted in response to the user providing user input to obtain intravascular imaging data in the visual display 700 (FIG. 7). The window 610 illustrates IVUS imaging data. The user may interact with the IVUS imaging data, such as by swiping through different cross-sectional IVUS images obtained along the imaged length of the vessel. A user can select one of the data options 636 in the window 632 to obtain additional data to evaluate the blood vessel. For example, the user can select the co-registration option based on the system recommendation in window 640.

Figure 9:
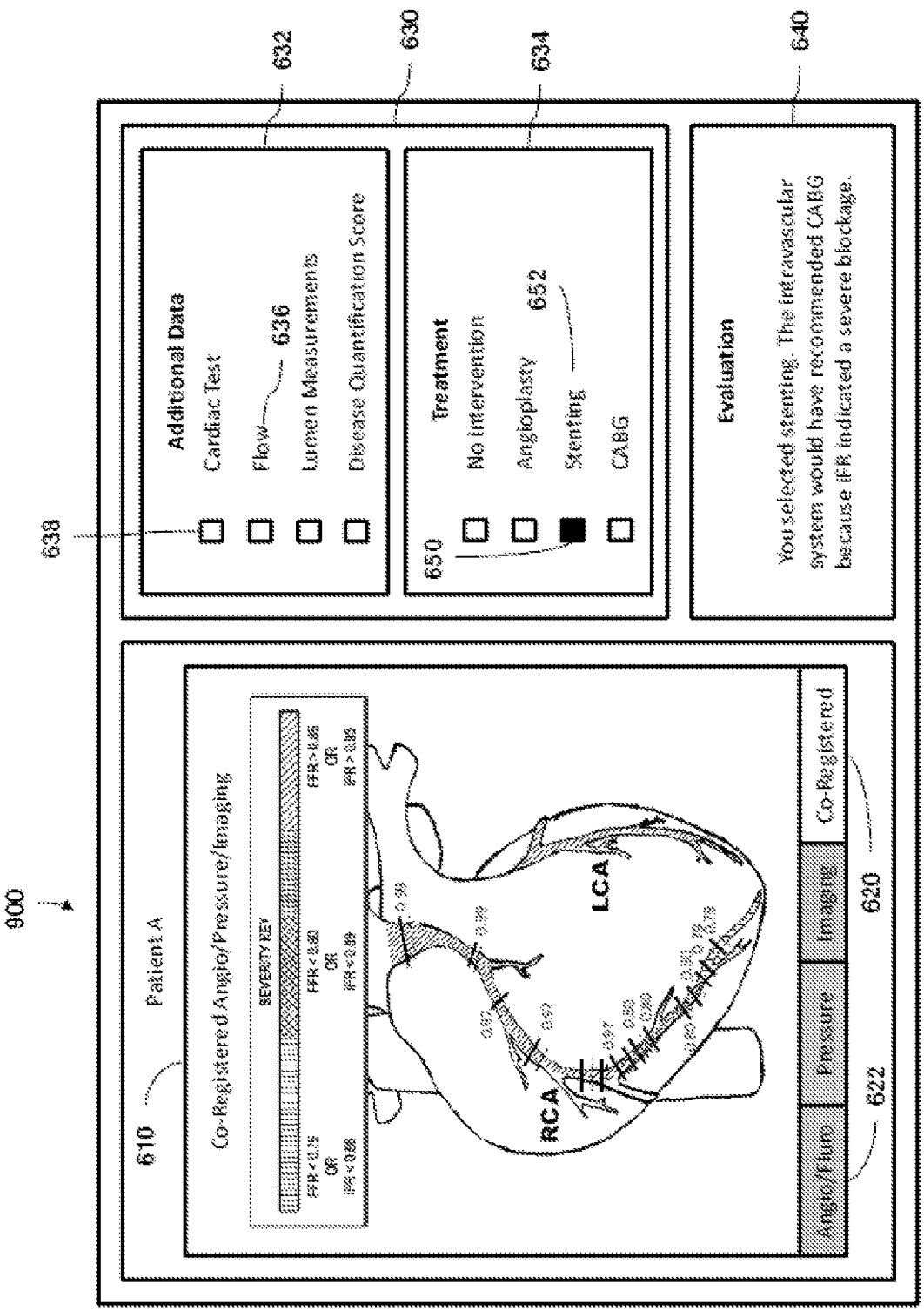
FIG. 9 is a visual display according to another embodiment of the present disclosure.

Referring now to FIG. 9, shown therein the visual display 900. The visual display 900 can be outputted in response to the user providing user input to view co-registered intravascular imaging data and pressure data in the visual display 800 (FIG. 8). The window 610 illustrates one or more coronary vessels with pressure value ranges indicated thereon. Markings transverse to the coronary vessels also indicated the locations at which pressure data and/or intravascular imaging data was obtained. Based on the available data (e.g., in the active window 620 and the inactive windows 622), the user can determine a therapeutic intervention to pursue to resolve the blockage in a blood vessel. For example, as shown, the user can selected the box 650 corresponding to the stenting option 652. In response to the user input, the computing system provides an evaluation in the window 640 indicating that CABG would have been recommended. The evaluation in window 640 of FIG. 9 can be described as negative feedback intended to cause the user to reevaluate his or her choice for treatment. In this manner, the systems, devices, and methods described herein provide an interactive simulation in which the user is able to learn from the guidance provided by the computing device. In other embodiments, such as when the user's selected treatment is the same as the computing device's recommended treatment, positive feedback is provided. For example, the positive feedback in response to selection of stenting can be similar to: "You selected stenting. 70% of clinicians in training data also selected stenting in similar circumstances. The efficacy of stenting was 80% at 6 months in the training data." In other circumstances, the computing system can provide neutral and/or otherwise educational feedback.

Figure 10:
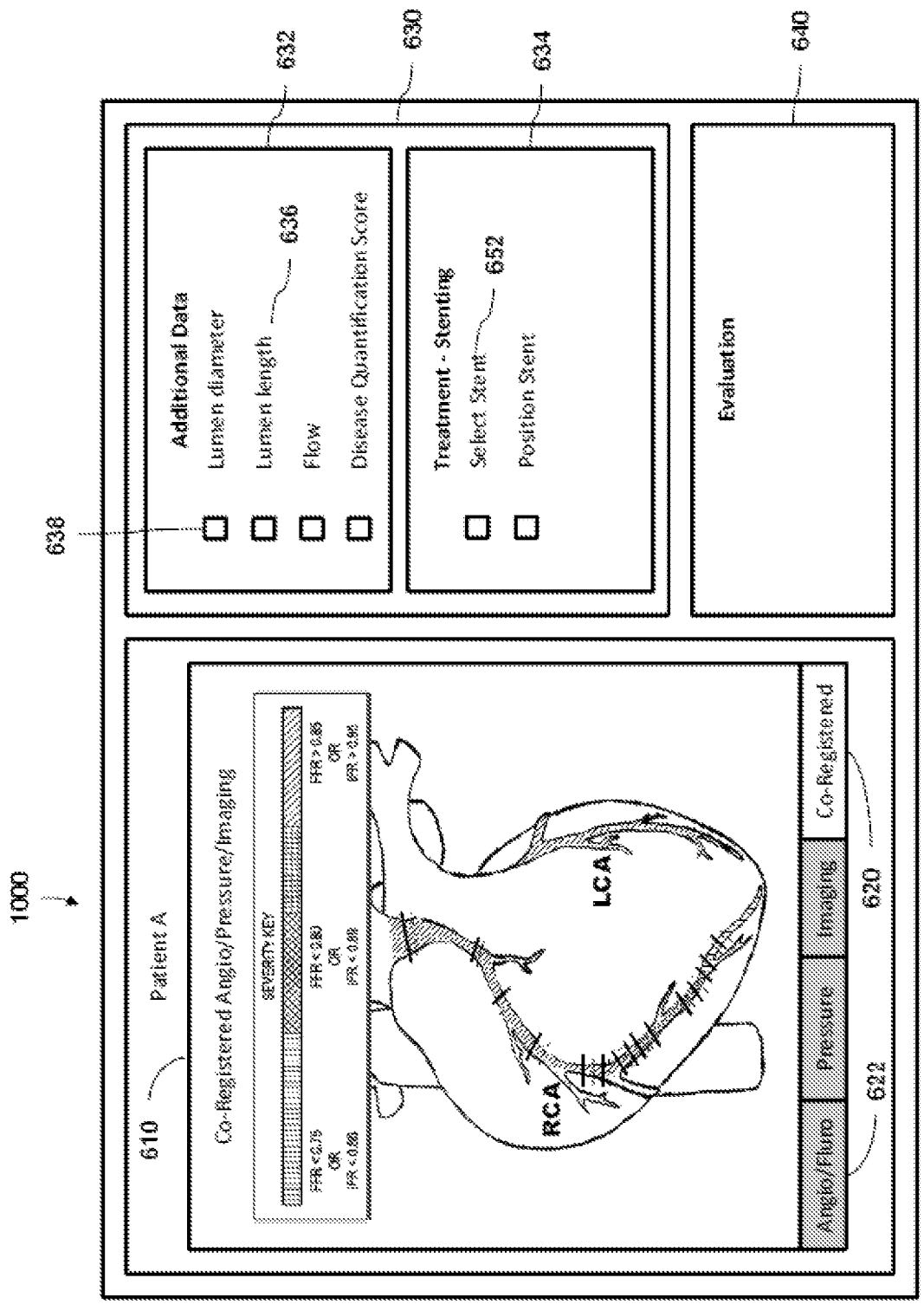
FIG. 10 is a visual display according to another embodiment of the present disclosure.

Referring now to FIG. 10, shown therein the visual display 1000. Visual display 1000 illustrates a modified window 634 with options particular to the selected treatment. For example, the window 634 can provide options 652 to selected one or more parameters associated with stenting, such as particular stent and the position of the stent.

Figure 11:
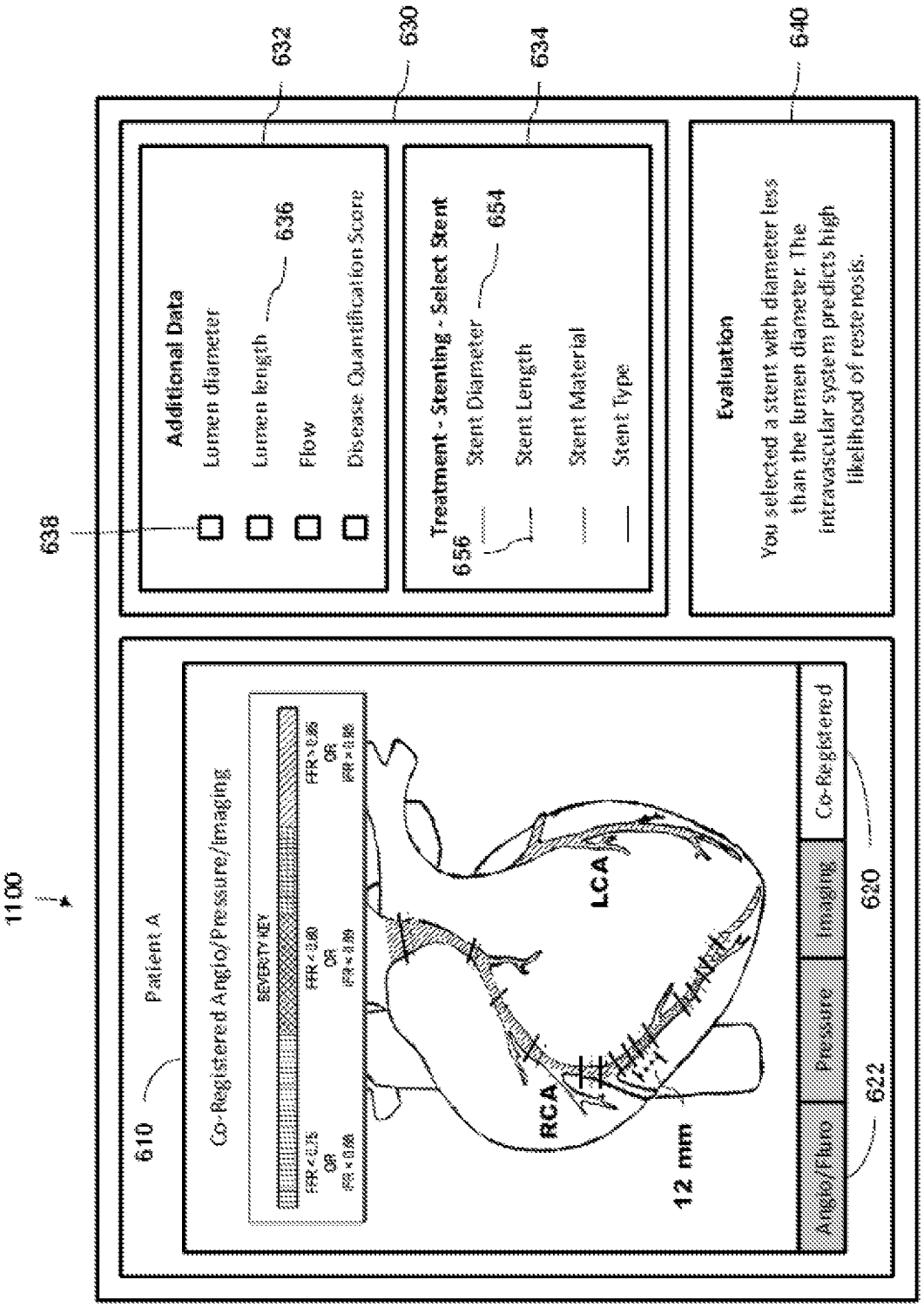
FIG. 11 is a visual display according to another embodiment of the present disclosure.

Referring now to FIG. 11, shown therein the visual display 1100. The visual display 1100 can be outputted in response to the user providing user input to select the particular stent to be used in the visual display 1000 (FIG. 10). The window 634 displays one or more parameters associated with the stent, such as diameter, length, material, and type. The user can provide user input specifying the particulars of the stent in the space 656. In some embodiments, selection of the space 656 causes a pre-populated list to be displayed (e.g., particular diameters, lengths, materials, etc., available from the stent manufacturer, etc.) The user can interact with the co-registered image of the vessel to determine the one or more parameters. For example, the user can measure a length and/or diameter of a vessel of a vessel. Once the one or more parameters for the stent are selected, the computing system can predict the efficacy of the intervention. For example, the computing system can provide negative feedback and/or guidance to fix, as illustrated in window 640 of FIG. 11. In response, the user can modify the one or more parameters such that the user is taught the intravascular procedure in an interactive manner. In other circumstances, the computing system can provide positive, neutral, and/or otherwise educational feedback.

Figure 12:
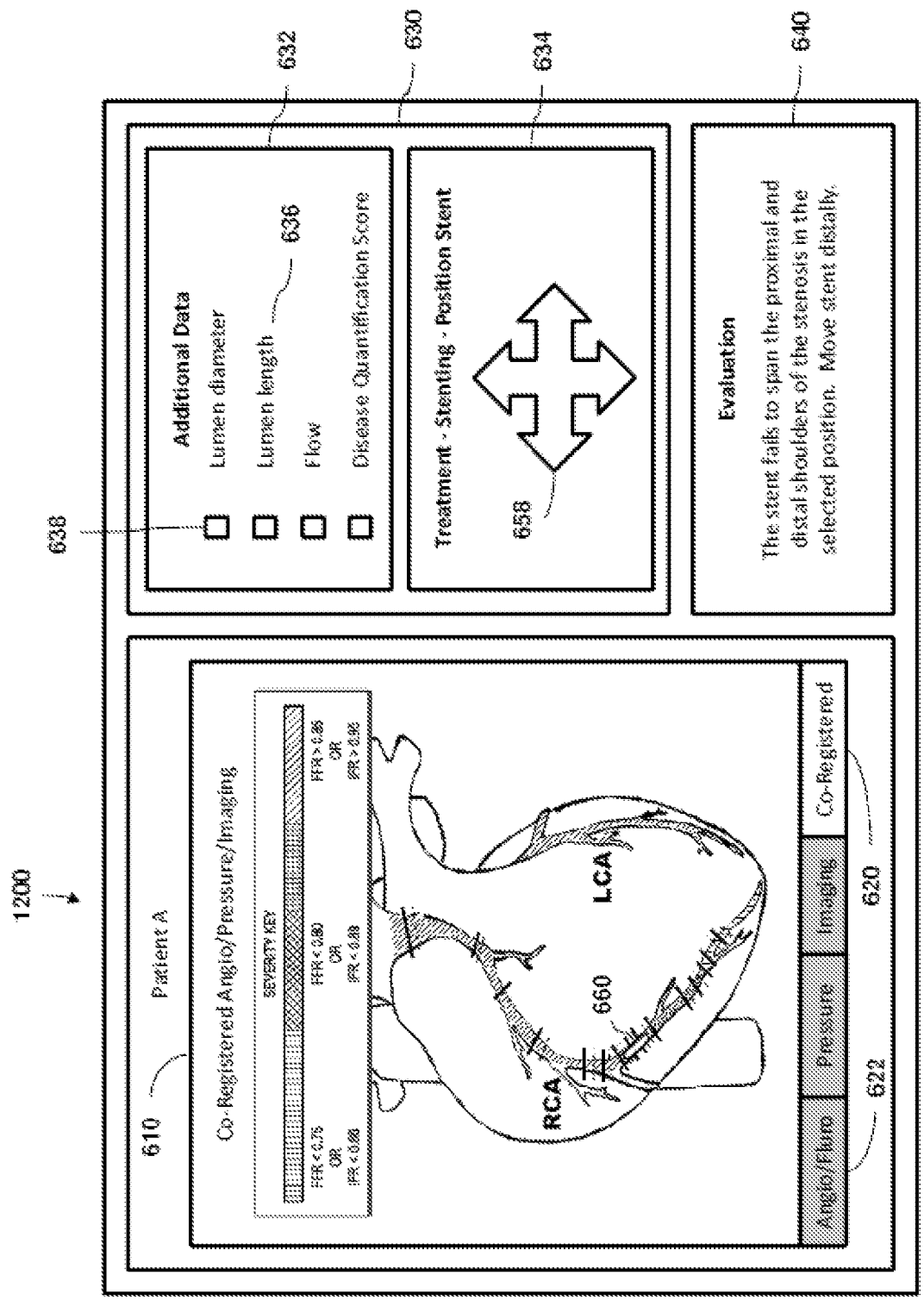
FIG. 12 is a visual display according to another embodiment of the present disclosure.

Referring now to FIG. 12, shown therein the visual display 1200. The visual display 1200 can be outputted in response to the user providing user input to select a particular position for the stent in the visual display 1000 (FIG. 10). A graphical representation of the stent 660 can be displayed on the visual representation of the blood vessel. The user can provide user input by directly touching and moving the stent 660 and/or by using the arrows 658 in the window 634. The computing device can output negative or positive feedback based on the selected location for the stent, such that user adjusts the stent location to learn the correct positioning.

Figure 13:
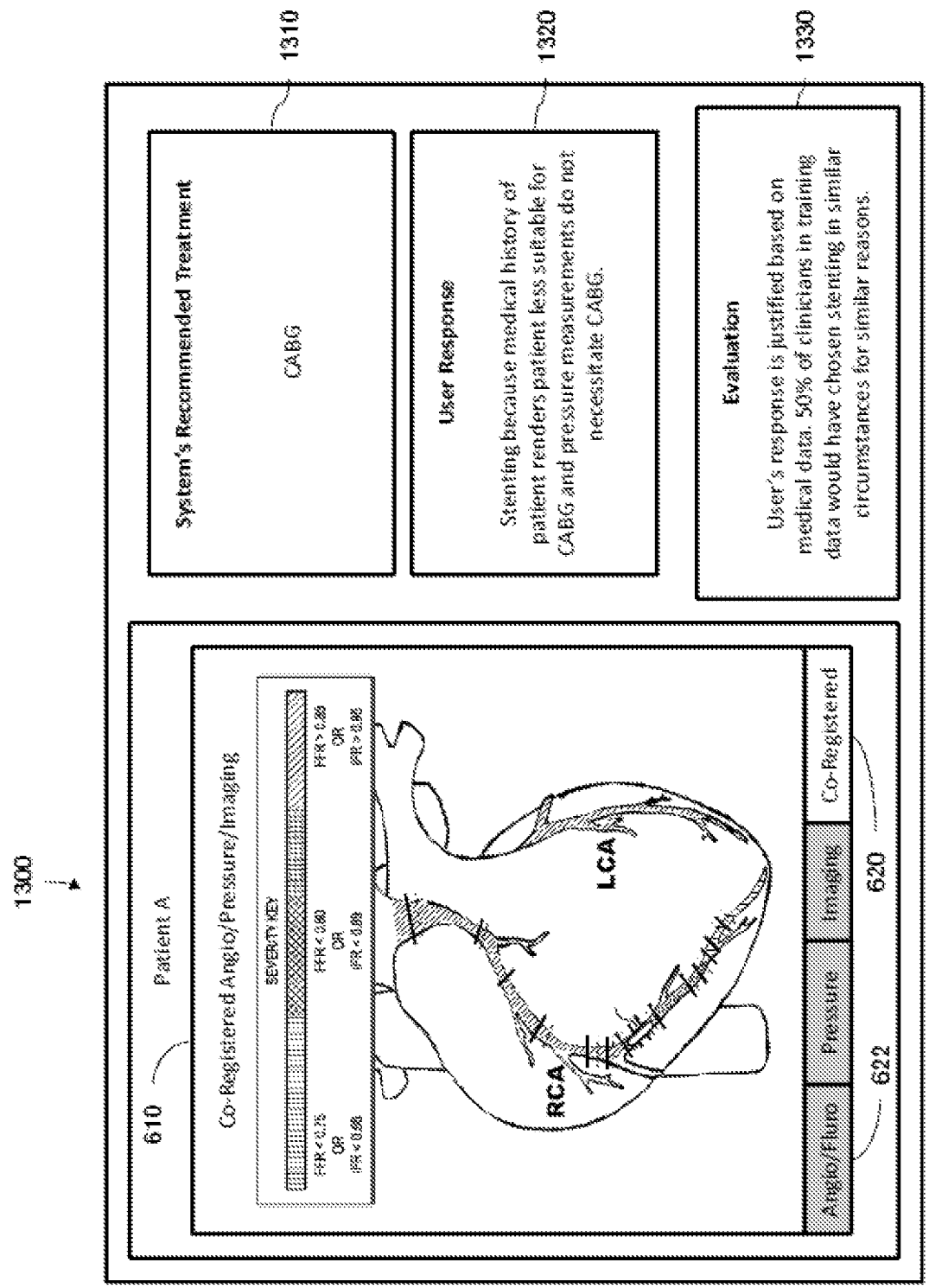
FIG. 13 is a visual display according to another embodiment of the present disclosure.

Referring now to FIG. 13, shown therein the visual display 1300. The visual display 1300 can be outputted in response to the user providing user input to evaluate system recommendations in the visual display 400 (FIG. 4). The available data is provided in the window 610, the active panel 620, and the inactive panels 622. The system recommendation is outputted in the window 1310. The user can interact with the available data and determine whether he or she agrees with the system's recommended intervention. The user can provide a response in the window 1320. In that regard, the window 1320 may provide space for natural language entry of user input, multiple choice, etc. In the illustrated in embodiment, the user responds by disagreeing with the system's recommended retreat. The computing system 1330 outputs in the window 1330 a positive, negative, or neutral evaluation of the user's response.

Persons skilled in the art will also recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method of simulating an intravascular procedure, the method comprising:
outputting, from a computing device to a display device in communication with the computing device, a visual representation of intravascular data representative of a blood vessel, wherein the intravascular data corresponds to a physiological value or an image;
automatically determining, using the computing device, a first course of action associated with the blood vessel based on the intravascular data;
receiving, at an input device in communication with the computing device, a user input selecting second course of action associated with the blood vessel;
comparing, using the computing device, the first course of action and the second course of action; and
outputting, from the computing device to the display device, a visual representation of the comparison of the first course of action and the second course of action, wherein the computing device comprises a teaching module being configured to guide a user through the intravascular procedure by asking which additional data to collect, which treatment to pursue, and to provide positive and/or negative feedback to the user's response.

2. A system for simulating an intravascular procedure, comprising:
a display device configured to display visual representations associated a blood vessel;
an input device configured to receive user inputs associated with the blood vessel; and
a computing device in communication with the display device and the input device, the computing device comprising:
a teaching module being configured to guide a user through the intravascular procedure by asking which additional data to collect, which treatment to pursue, and to provide positive and/or negative feedback to the user's response,
wherein the computing device is configured to:
output, to the display device, a visual representation of intravascular data representative of the blood vessel, wherein the intravascular data corresponds to a physiological value or an image;
automatically determine a first course of action associated with the blood vessel based on the intravascular data;
receive, from the input device, a signal based on a user input selecting a second course of action associated with the blood vessel;
compare the first course of action and the second course of action; and
output, to the display device, a visual representation of the comparison of the first course of action and the second course of action.

3. The system of claim 2, wherein the computing device is configured to compare the first course of action and the second course of action by determining if the second course of action is the same as the first course of action.

4. The system of claim 3, wherein the computing device is configured to output a visual representation of the comparison by at least one of:
providing a visual representation indicating that the second course of action is the same as the first course of action; or
providing a visual representation indicating that the second course of action is the different than the first course of action.

5. The system of claim 2, wherein the computing device is further configured to output, to the display device, a plurality of options associated with collection of data types representative of the blood vessel, and wherein the computing device is configured to receive a user input selecting the second course of action by receiving selection of at least one of the plurality of options.

6. The system of claim 2, wherein the computing device is further configured to receive, from the input device, a signal based on a user input selecting the intravascular data.

7. The system of claim 2, wherein at least one of:
the intravascular data is selected from a group consisting of: angiogram data, fluoroscopy data, pressure data, flow data, imaging data, disease quantification data, virtual histology data, and co-registration data; or
the first course of action or the second course of action is selected from a group consisting of: collecting angiogram data, collecting fluoroscopy data, collecting pressure data, collecting flow data, collecting imaging data, collecting disease quantification data, collecting virtual histology data, and collecting co-registration data.

8. The system of claim 2, wherein the computing device is further configured to determine a first therapeutic intervention for the blood vessel based on at least one of the intravascular data, the first course of action or the second course of action.

9. The system of claim 8, wherein the computing device is further configured to:
receive, from the input device, a signal based on a user input selecting a second therapeutic intervention for the blood vessel.

10. The system of claim 9, wherein the computing device is further configured to output, to the display device, a plurality of data options representative of therapeutic intervention types for the blood vessel, and wherein the computing device is configured to receive a signal based on a user input selecting a second therapeutic intervention by receiving selection of at least one of the plurality of data options.

11. The system of claim 9, wherein at least one of the first or second therapeutic intervention is selected from the group consisting of: angioplasty, stenting, and coronary artery bypass grafting (CABG).

12. The system of claim 9, wherein the computing device is further configured to: compare the first and second therapeutic interventions; and
output, to the display device, a visual representation of the comparison of first and second therapeutic interventions.

13. The system of claim 12, wherein the computing device is configured to compare the first and second therapeutic interventions by determining if the first and second therapeutic interventions are the same, and wherein the computing device is configured to output a visual representation of the comparison by at least one of:
providing a visual representation indicating that the first and second therapeutic interventions are the same; or
providing a visual representation indicating that first and second therapeutic interventions are different.

14. The system of claim 2, wherein the computing device is configured to determine the first course of action based on the intravascular data and a first therapeutic intervention.

* * * * *